US012800337B2

(12) United States Patent
Suzuki et al.

(10) Patent No.: US 12,800,337 B2
(45) Date of Patent: Nov. 17, 2026

(54) IN-VEHICLE APPARATUS

(71) Applicant: SUBARU CORPORATION, Tokyo (JP)

(72) Inventors: Tomoaki Suzuki, Tokyo (JP); Kento Matsudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 21 days.

(21) Appl. No.: 18/817,431

(22) Filed: Aug. 28, 2024

(65) Prior Publication Data

US 2025/0076074 A1 Mar. 6, 2025

(30) Foreign Application Priority Data

Sep. 6, 2023 (JP) ................................ 2023-144195

(51) Int. Cl.

| | |
|---|---|
| ***G01C 21/36*** | (2006.01) |
| ***G01C 21/34*** | (2006.01) |
| ***G01G 19/12*** | (2006.01) |
| ***G01M 9/00*** | (2006.01) |
| ***G06T 7/60*** | (2017.01) |

(52) U.S. Cl.
CPC ..... *G01C 21/3697* (2013.01); *G01C 21/3469* (2013.01); *G01G 19/12* (2013.01); *G01M 9/00* (2013.01); *G06T 7/60* (2013.01)

(58) Field of Classification Search
CPC ............ G01C 21/3697; G01C 21/3469; G01G 19/12; G01M 9/00; G06T 7/60
See application file for complete search history.

(56) References Cited

U.S. PATENT DOCUMENTS

| | | | | |
|---|---|---|---|---|
| 2009/0024310 A1* | 1/2009 | Karrie | ................... | G01M 1/122 701/124 |
| 2017/0334344 A1* | 11/2017 | Salter | ....................... | B60Q 9/00 |
| 2024/0012422 A1* | 1/2024 | Haupt | .................. | G05D 1/0293 |
| 2024/0142247 A1* | 5/2024 | Ropel | ..................... | B60L 58/13 |

FOREIGN PATENT DOCUMENTS

| | | | | | |
|---|---|---|---|---|---|
| CN | 113984079 | A | * | 1/2022 | ......... G01C 21/3682 |
| CN | 116246233 | A | * | 6/2023 | ............. G06V 20/54 |
| DE | 102019007493 | A1 | * | 8/2020 | ............ B60W 40/09 |
| JP | 2013-152149 | A | | 8/2013 | |
| JP | 2016049922 | A | * | 4/2016 | |
| WO | WO-2014048995 | A1 | * | 4/2014 | ............. G01C 11/06 |

* cited by examiner

*Primary Examiner* — Rachid Bendidi
*Assistant Examiner* — Joseph Anderson Yanoska
(74) *Attorney, Agent, or Firm* — Rimon P.C.

(57) ABSTRACT

An in-vehicle apparatus includes a load weight information obtainer, a load information obtainer, an aerodynamic analyzer, a specific power consumption calculator, and a route information retriever. The load weight information obtainer acquires a load weight of a load placed on a roof rail or a roof carrier of the vehicle. The load information obtainer acquires load information including a size and a shape of the load from image data on the load. The aerodynamic analyzer executes an aerodynamic analysis based on the load information. The specific power consumption calculator calculates a specific power consumption based on the load weight and a result of the aerodynamic analysis. The route information retriever retrieves route information including a charging timing in travel from a departure point to a destination based on a current amount of charge and a result of calculating by the specific power consumption calculator.

6 Claims, 18 Drawing Sheets

| FRONTAL PROJECTED AREA Sz [$m^2$] | LEVEL OF DETERIORATION IN SPECIFIC POWER CONSUMPTION | EXAMPLE OF LOAD |
|---|---|---|
| $Sz > A$ | LEVEL 1 | OBJECT PLACED IN ROOF BOX |
| $A \leq Sz < B$ | LEVEL 2 | OBJECT SUCH AS SKI BOARD PLACED ON ROOF CARRIER |
| $B \leq Sz < C$ | LEVEL 3 | OBJECT SUCH AS SURF BOARD PLACED ON ROOF CARRIER |
| $C \leq Sz < D$ | LEVEL 4 | OBJECT SUCH AS BICYCLE PLACED ON ROOF CARRIER |
| $D \leq Sz$ | LEVEL 5 | OBJECT SUCH AS BOAT |

FIG. 4A

| SIDE PROJECTED AREA Ss [$m^2$] | ADJUSTMENT VALUE FOR LEVEL OF DETERIORATION |
|---|---|
| $Ss > E$ | NO ADJUSTMENT: LEVEL OF DETERIORATION IN SPECIFIC POWER CONSUMPTION DETERMINED BASED ON FRONTAL PROJECTED AREA Sz |
| $E \leq Ss$ | +1 LEVEL (INCREASE LEVEL OF DETERIORATION IN SPECIFIC POWER CONSUMPTION DETERMINED BASED ON FRONTAL PROJECTED AREA Sz BY ONE LEVEL) |

FIG. 4B

| RESULT OF ANALYSIS BY AERODYNAMIC ANALYZER 13: LEVEL OF DETERIORATION IN SPECIFIC POWER CONSUMPTION | RATE OF DETERIORATION IN SPECIFIC POWER CONSUMPTION [%] |
|---|---|
| LEVEL 1 | $\alpha_1$ |
| LEVEL 2 | $\alpha_2$ |
| LEVEL 3 | $\alpha_3$ |
| LEVEL 4 | $\alpha_4$ |
| LEVEL 5 | $\alpha_5$ |

FIG. 5A

| | |
|---|---|
| REFERENCE SPECIFIC POWER CONSUMPTION | X km/kwh |
| RATE OF DETERIORATION IN SPECIFIC POWER CONSUMPTION PER LOAD WEIGHT | Y %/kg |

FIG. 5B

IN-VEHICLE APPARATUS

CROSS-REFERENCE TO RELATED APPLICATIONS

The present application claims priority from Japanese Patent Application No. 2023-144195 filed on Sep. 6, 2023, the entire contents of which are hereby incorporated by reference.

BACKGROUND

The disclosure relates to an in-vehicle apparatus.

Electric vehicles including accumulator batteries chargeable by external power sources have become popular from a viewpoint of environment protection.

In general, in order to enjoy long-distance driving of a vehicle such as an electric vehicle, it is necessary to charge the accumulator battery in a power charging facility located within a cruising range of the vehicle before the accumulator battery is completely discharged.

For example, Japanese Unexamined Patent Application Publication (JP-A) No. 2013-152149 discloses a technique that retrieves route information including a charge timing in travel of a vehicle from a departure point to a destination based on a current amount of electric charge and a specific power consumption of the vehicle, and performs route guidance based on the route information.

SUMMARY

An aspect of the disclosure provides an in-vehicle apparatus to be applied to a vehicle. The in-vehicle apparatus includes a load weight information obtainer, a load information obtainer, an aerodynamic analyzer, a specific power consumption calculator, and a route information retriever. The load weight information obtainer is configured to acquire a load weight of a load placed on a roof rail or a roof carrier of the vehicle. The load information obtainer is configured to acquire load information including a size and a shape of the load from image data of the load. The aerodynamic analyzer is configured to execute an aerodynamic analysis based on the load information acquired by the load information obtainer. The specific power consumption calculator is configured to calculate a specific power consumption of the vehicle based on the load weight and a result of the aerodynamic analysis executed by the aerodynamic analyzer. The route information retriever is configured to retrieve route information including a charging timing in travel from a departure point to a destination based on a current amount of charge and a result of calculating by the specific power consumption calculator.

An aspect of the disclosure provides an in-vehicle apparatus to be applied to a vehicle. The in-vehicle apparatus includes one or more processors and one or more memories communicably coupled to the one or more processors. The one or more processors are configured to acquire a load weight of a load placed on a roof rail or a roof carrier of the vehicle, acquire load information including a size and a shape of the load from image data on the load, execute an aerodynamic analysis based on the load information acquired, calculate a specific power consumption of the vehicle based on the load weight and a result of the aerodynamic analysis, and retrieve route information including a charging timing in travel from a departure point to a destination based on a current amount of charge and a result of calculating the specific power consumption.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 4A is a table describing preset information stored in a memory of the in-vehicle apparatus illustrated in FIG. 1.

FIG. 4B is a table describing the preset information stored in the memory of the in-vehicle apparatus illustrated in FIG. 1.

FIG. 5A is a table describing the preset information stored in the memory of the in-vehicle apparatus illustrated in FIG. 1.

FIG. 5B is a table describing the preset information stored in the memory of the in-vehicle apparatus illustrated in FIG. 1.

DETAILED DESCRIPTION

Figure 1:
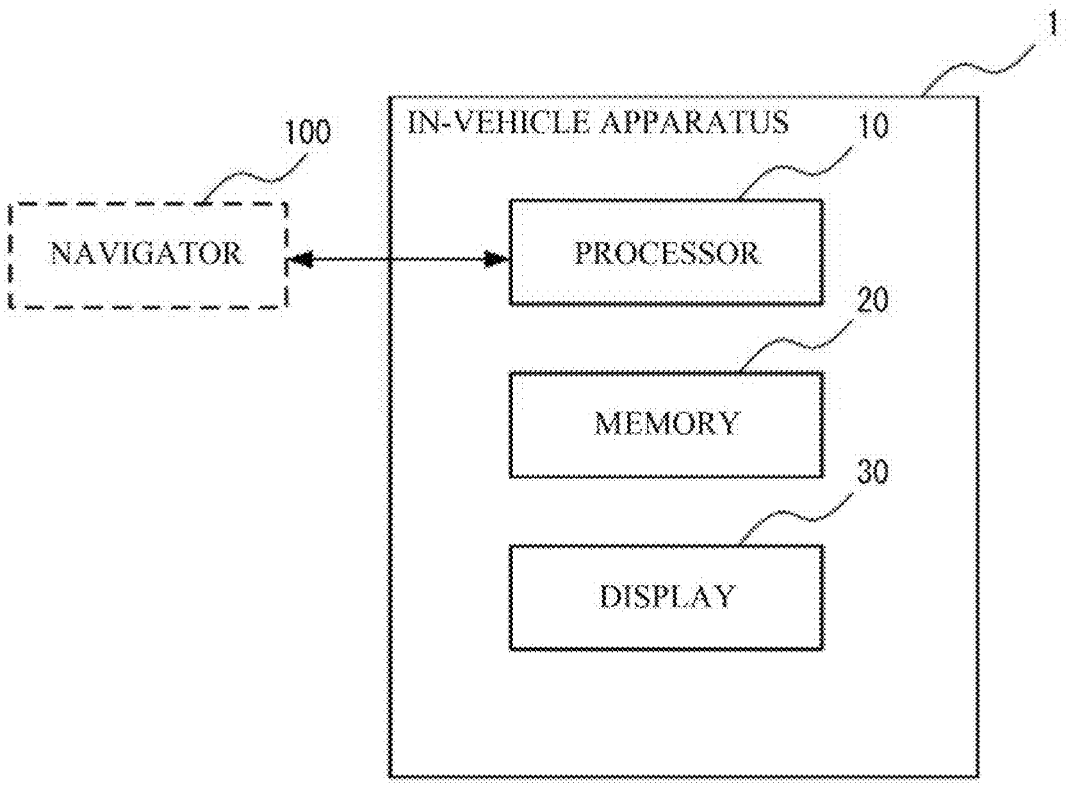
FIG. 1 is a block diagram illustrating a configuration of an in-vehicle apparatus according to one example embodiment of the disclosure.

In general, the specific power consumption of an electric vehicle deteriorates due to a load placed on a roof carrier or the like of the vehicle while the vehicle is traveling as the load increases aerodynamic drag and the load weight of the vehicle.

However, a technique described in (JP-A) No. 2013-152149 fails to take into consideration the deterioration in specific power consumption caused by the load placed on the roof carrier or the like of the vehicle while the vehicle is traveling. This raises a concern that a user of the vehicle is to charge an accumulator battery at a different charging timing from a charging timing presented before the vehicle starts traveling.

It is desirable to provide an in-vehicle apparatus that presents a user with route information including a charging timing in travel of a vehicle from a departure point to a destination, taking into consideration a deterioration in specific power consumption of the vehicle caused by a load placed on a roof carrier or the like of the vehicle.

In the following, some example embodiments of the disclosure are described in detail with reference to FIGS. 1 to 18. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

An in-vehicle apparatus 1 according to a first example embodiment of the disclosure will now be described with reference to FIGS. 1 to 7.

<Configuration of In-Vehicle Apparatus 1>

As illustrated in FIG. 1, the in-vehicle apparatus 1 according to the first example embodiment may include a processor 10, a memory 20, and a display 30.

In the first example embodiment, the processor 10 calculates a specific power consumption of a vehicle including the in-vehicle apparatus 1 based on load information on a load placed on a roof rail or a roof carrier of the vehicle.

In the first example embodiment, the processor 10 retrieves route information including a charging timing in travel of the vehicle from a departure point to a destination, based on the calculated specific power consumption and information on the departure point and the destination acquired from a navigator 100, for example.

In the first example embodiment, the processor 10 transmits the retrieved route information to the navigator 100.

In the first example embodiment, when receiving the route information from the processor 10, the navigator 100 may perform route guidance from the departure point to the destination and guidance on power charging based on the route information received from the processor 10.

In the first example embodiment, the processor 10 may cause the display 30, which will be described later, to display an error message when the size or shape of the load is inappropriate, for example.

A configuration of the processor 10 will be described later.

The memory 20 may include a non-illustrated read only memory (ROM) and a non-illustrated random access memory (RAM).

For example, the memory 20 may store a control program and various kinds of data received from the processor 10.

In the first example embodiment, the memory 20 may preliminarily store, for example, map information and information on locations of power charging facilities.

In the first example embodiment, the memory 20 may preliminarily store, for example, preset information to which the processor 10 refers when determining the level of deterioration in specific power consumption of the vehicle caused by the load.

In the first example embodiment, the memory 20 may preliminarily store the preset information to which the processor 10 refers when calculating the specific power consumption.

The preset information will be described later.

The display 30 may be, for example, a display panel such as a liquid crystal display, and may display information received from the processor 10.

In some embodiments, the display 30 may be a display panel of the navigator 100, for example.

<Configuration of Processor 10>

Figure 2:
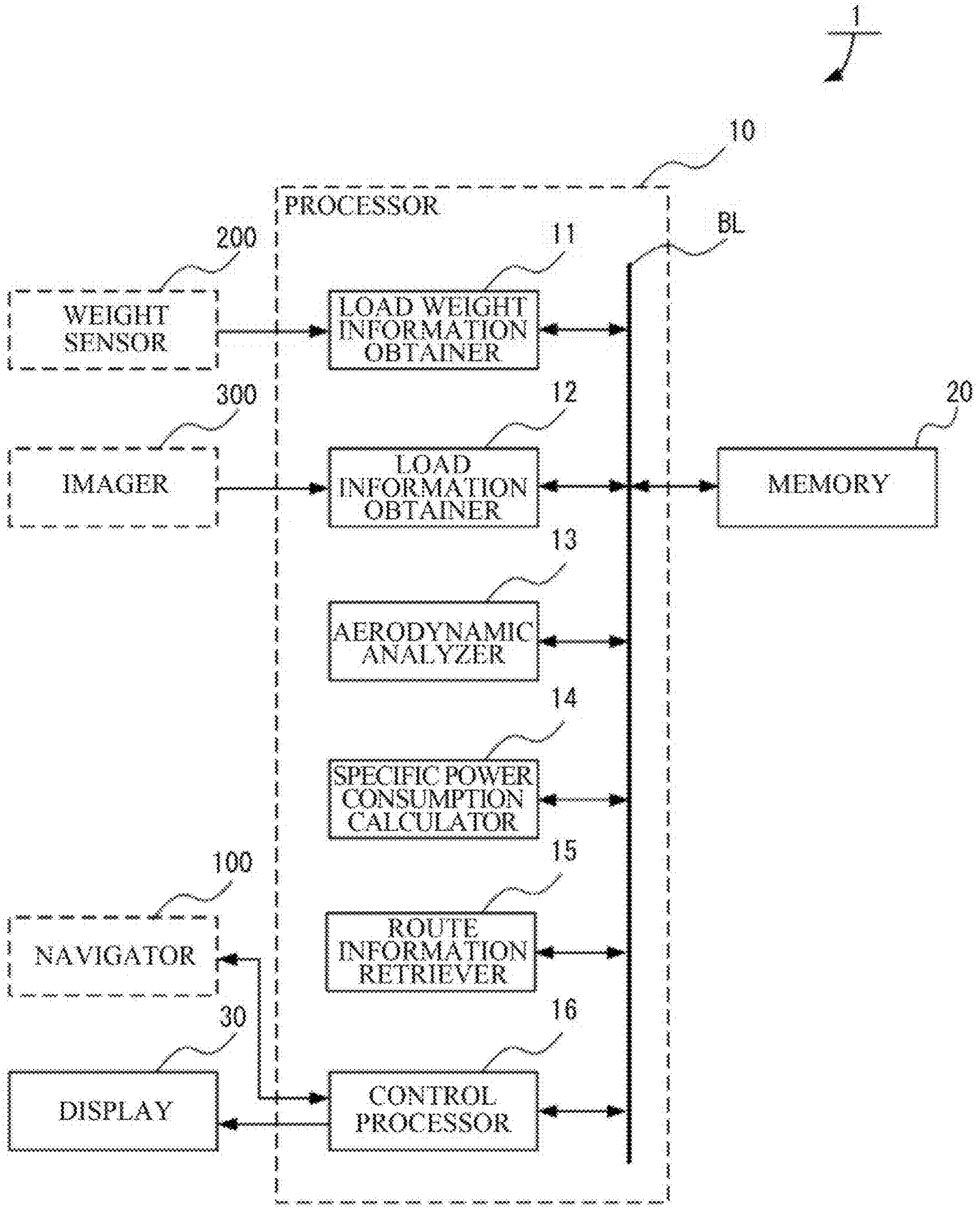
FIG. 2 is a block diagram illustrating a configuration of a processor in the in-vehicle apparatus illustrated in FIG. 1.

As illustrated in FIG. 2, the processor 10 may include a load weight information obtainer 11, a load information obtainer 12, an aerodynamic analyzer 13, a specific power consumption calculator 14, a route information retriever 15, and a control processor 16.

These components of the processor 10 and the memory 20 may transmit and receive various kinds of data therebetween via a bus line BL.

The load weight information obtainer 11 acquires the load weight of the load placed on the roof rail or the roof carrier of the vehicle including the in-vehicle apparatus 1 according to the first example embodiment.

For example, the load weight information obtainer 11 may acquire the load weight of the load, based on a sensor output from a weight sensor 200 disposed on the roof rail or the roof carrier, for example.

The load weight information obtainer 11 may transmit the acquired load weight to the control processor 16, which will be described later, via the bus line BL.

The load information obtainer 12 acquires the size and shape of the load from image data.

For example, the load information obtainer 12 may acquire information on the size and shape of the load from image data of the load captured by one or more imagers 300 fixed to the vehicle.

In some embodiments, the load information obtainer 12 may acquire the information on the size and shape of the load from image data of the load captured by a portable device owned by a user, for example.

The load information obtainer 12 may acquire information on a state of the load fixed to the vehicle from the image data, for example.

For instance, the load information obtainer 12 may acquire, from the image data, information as to whether the load is fixed or lashed to the roof rail or the roof carrier.

For instance, the load information obtainer 12 may acquire, from the image data, information as to whether a risky object such as a bladed tool or a fuel tank is included in the load.

Hereinafter, the information acquired by the load information obtainer 12 may be collectively referred to as load information.

The load information obtainer 12 may transmit the acquired load information to the control processor 16, which will be described later, via the bus line BL.

The aerodynamic analyzer 13 may execute an aerodynamic analysis based on the load information acquired by the load information obtainer 12.

An example of the aerodynamic analysis will now be described.

Figure 3A:
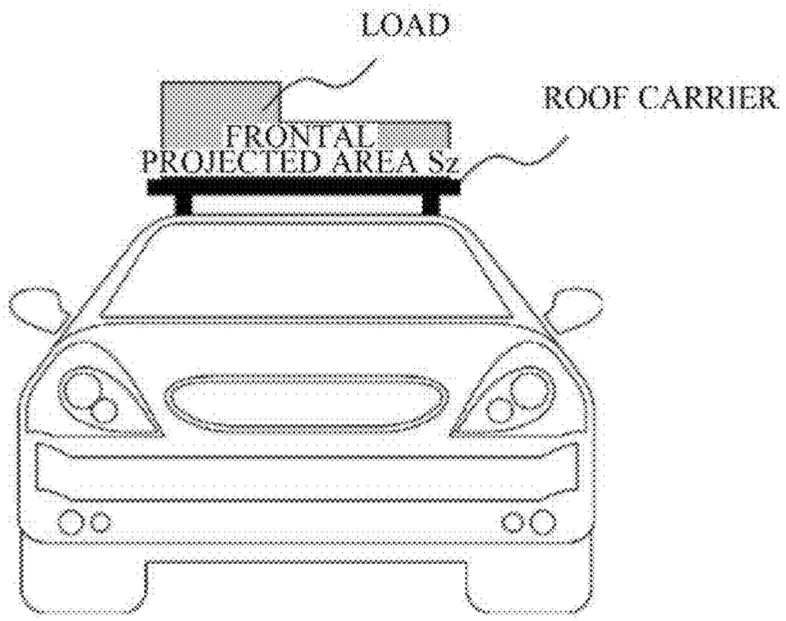
FIG. 3A is a diagram illustrating a frontal projected area calculated by the in-vehicle apparatus illustrated in FIG. 1.
Figure 3B:
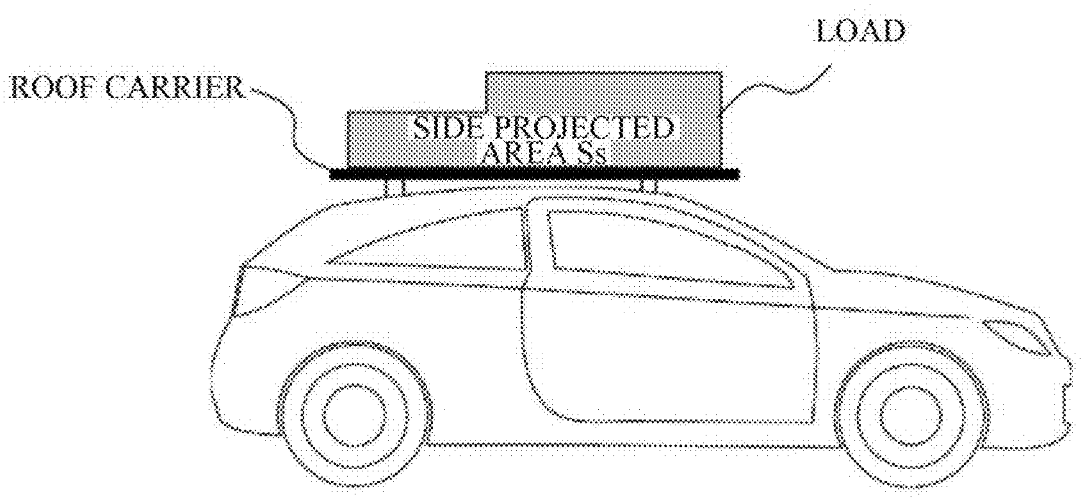
FIG. 3B is a diagram illustrating a side projected area calculated by the in-vehicle apparatus illustrated in FIG. 1.

In the first example embodiment, the aerodynamic analyzer 13 may calculate a frontal projected area Sz and a side projected area Ss of the load based on the load information acquired by the load information obtainer 12, as illustrated in FIGS. 3A and 3B, for example.

In the first example embodiment, the aerodynamic analyzer 13 may determine the level of deterioration in specific power consumption based on the calculated frontal projected area Sz and the calculated side projected area Ss, for example.

The aerodynamic analyzer 13 may determine the level of the deterioration in specific power consumption based on preset information illustrated in FIGS. 4A and 4B, for example.

The preset information may include a correlation between the frontal projected area Sz and the level of deterioration in specific power consumption.

The preset information may include a correlation between the side projected area Ss and an adjustment value for the level of deterioration in specific power consumption.

The aerodynamic analyzer 13 may determine the level of deterioration in specific power consumption based on the frontal projected area Sz and adjust the determined level of deterioration in specific power consumption based on the side projected area Ss.

When the side projected area Ss is smaller than a predetermined area, the aerodynamic analyzer 13 may refrain from adjusting the level of deterioration in specific power consumption determined based on the frontal projected area Sz.

When the side projected area Ss is larger than or equal to the predetermined area, the aerodynamic analyzer 13 may adjust the level of deterioration in specific power consumption determined based on the frontal projected area Sz by increasing the determined level by one level.

When the frontal projected area Sz is smaller than A ($m^2$) and the side projected area Ss is smaller than E ($m^2$), for example, the aerodynamic analyzer 13 may determine the level of deterioration in specific power consumption to be Level 1.

When the frontal projected area Sz is smaller than A ($m^2$) and the side projected area Ss is larger than or equal to E ($m^2$), for example, the aerodynamic analyzer 13 may determine the level of deterioration in specific power consumption to be Level 2.

The aerodynamic analyzer 13 may transmit the level of deterioration in specific power consumption to the control processor 16, which will be described later, via the bus line BL.

When determining that the size or the shape of the load is inappropriate, the aerodynamic analyzer 13 may transmit the result of the analysis indicating that the size or shape of the load is inappropriate to the control processor 16 to be described later.

When the calculated frontal projected area Sz is larger than a predetermined area, for example, the aerodynamic analyzer 13 may transmit a result of the analysis indicating that the frontal projected area is inappropriate to the control processor 16 to be described later.

When the calculated side projected area Ss is larger than a predetermined area, for example, the aerodynamic analyzer 13 may send a result of the analysis indicating that the side projected area is inappropriate to the control processor 16 to be described later.

When determining that the load has a height higher than a predetermined height based on the load information, for example, the aerodynamic analyzer 13 may transmit a result of the analysis indicating that the height of the load is inappropriate to the control processor 16 to be described later.

The specific power consumption calculator 14 may calculate the specific power consumption based on the load weight of the load acquired by the load weight information obtainer 11 and the result of the analysis by the aerodynamic analyzer 13.

An example of the method of calculating the specific power consumption will now be described.

The specific power consumption calculator 14 may acquire preset information illustrated in FIGS. 5A and 5B, for example, from the memory 20 to calculate the specific power consumption.

The preset information may include, for example, the result of the analysis by the aerodynamic analyzer 13 (i.e., the level of deterioration in specific power consumption), the data indicating the correlation with the rate of deterioration in specific power consumption (e.g., $\alpha_1$ to $\alpha_5$), data on a reference specific power consumption (X km/kwh) of the vehicle, and data on the rate of deterioration in specific power consumption per load weight (Y %/kg).

The reference specific power consumption may be a specific power consumption measured in a worldwide harmonized light duty driving test cycle (WLTC) mode, for example.

The specific power consumption calculator 14 may determine the rate of deterioration in specific power consumption caused by an increase in aerodynamic drag to be any one of a to as, based on the result of the analysis by the aerodynamic analyzer 13 (i.e., the level of deterioration in specific power consumption) and the acquired preset information, for example.

Based on the rate of deterioration in specific power consumption per load weight (Y %/kg) and the load weight of the load acquired by the load weight information obtainer 11, for example, the specific power consumption calculator 14 may calculate a rate of deterioration in specific power consumption β caused by the load weight.

The specific power consumption calculator 14 may determine the total value of the rate of deterioration in specific power consumption ($\alpha_1$ to $\alpha_5$) caused by the increase in aerodynamic drag and the rate of deterioration in specific power consumption β caused by the load weight to be a rate of deterioration in specific power consumption γ, for example.

Based on the reference specific power consumption acquired from the preset information and the rate of deterioration in specific power consumption γ, for example, the specific power consumption calculator 14 may calculate the specific power consumption of the vehicle.

The specific power consumption calculator 14 may transmit the result of the determination to the control processor 16, which will be described later, via the bus line BL.

The route information retriever 15 retrieves the route information including the charging timing in the travel from the departure point to the destination, based on a current amount of charge and the result of the calculation by the specific power consumption calculator 14.

The route information retriever 15 may calculate a cruising range based on data on a current residual amount of charge received from the control processor 16 to be described later, and the specific power consumption calculated by the specific power consumption calculator 14, for example.

Based on the calculated cruising range, the map information and the information on the locations of the power charging facilities acquired from the memory 20, and the information on the departure point and the destination received from the control processor 16 to be described later, for example, the route information retriever 15 may retrieve a traveling route from the departure point to the destination via a power charging facility located within the cruising range.

The route information retriever 15 may transmit the retrieved route information to the control processor 16, which will be described later, via the bus line BL.

The control processor 16 may control an overall operation of the in-vehicle apparatus 1 in accordance with the control program stored in the memory 20.

In the first example embodiment, the control processor 16 may send an instruction to acquire the load weight of the load to the load weight information obtainer 11 via the bus line BL, for example.

In the first example embodiment, the control processor 16 may send an instruction to acquire the load information to the load information obtainer 12 via the bus line BL, for example.

In the first example embodiment, the control processor 16 may transmit the load information received from the load information obtainer 12 to the aerodynamic analyzer 13 via the bus line BL, for example, to cause the aerodynamic analyzer 13 to execute the aerodynamic analysis.

In the first example embodiment, the control processor 16 may transmit the load weight of the load received from the load weight information obtainer 11 and the result of the analysis by the aerodynamic analyzer 13 to the specific power consumption calculator 14 via the bus line BL, for example, to cause the specific power consumption calculator 14 to calculate the specific power consumption.

In the first example embodiment, the control processor 16 may acquire the information on the departure point and the destination from the navigator 100, for example.

In the first example embodiment, the control processor 16 may acquire the current residual amount of charge of an accumulator battery from a non-illustrated charge control processor that controls power charging of the accumulator battery, for example.

In the first example embodiment, the control processor 16 may transmit the current residual amount of charge of the accumulator battery, the information on the departure point and the destination, and the result of the calculation by the specific power consumption calculator 14 to the route information retriever 15 via the bus line BL, for example, to cause the route information retriever 15 to retrieve the route information.

In the first example embodiment, the control processor 16 may transmit the route information received from the route information retriever 15 to the navigator 100.

When receiving the route information from the control processor 16, the navigator 100 may display the received route information and start the route guidance from the departure point to the destination.

In the first example embodiment, the control processor 16 may perform control to cause the display 30 to display information.

For example, the control processor 16 may transmit the load weight acquired from the load weight information obtainer 11 and the specific power consumption calculated by the specific power consumption calculator 14 to the display 30, for example.

In the first example embodiment, when determining that the size or shape of the load is inappropriate based on the result of the analysis by the aerodynamic analyzer 13, for example, the control processor 16 may cause the display 30 to display an error message.

When receiving the result of the analysis indicating that the frontal projected area is inappropriate from the aerodynamic analyzer 13, for example, the control processor 16 may send the display 30 an error message indicating "The frontal projected area of the load is larger than a reference value. If you drive the vehicle in this state, the load can fall from the vehicle."

When receiving the result of the analysis indicating that the side projected area is inappropriate from the aerodynamic analyzer 13, for example, the control processor 16 may send the display 30 an error message indicating "The side projected area of the load is larger than a reference value. If you drive the vehicle in this state, the vehicle can cause a rollover accident."

When receiving the result of the analysis indicating that the height of the load is inappropriate from aerodynamic analyzer 13, for example, the control processor 16 may send the display 30 an error message indicating "The height of the load is higher than a reference value. If you drive the vehicle in this state, the vehicle can cause a rollover accident."

In some embodiments, the control processor 16 may cause the display 30 to display image data indicating an inappropriate state of the load together with the error message.

In some embodiments, the control processor 16 may cause the display 30 to display the error message based on the information received from the load weight information obtainer 11 or the load information obtainer 12.

When the load weight of the load acquired from the load weight information obtainer 11 is greater than a predetermined weight, for example, the control processor 16 may send the display 30 an error message indicating "The weight of the load is greater than a reference value. Reduce the load weight."

When receiving information indicating that there is a load unfixed to the vehicle from the load information obtainer 12, for example, the control processor 16 may send the display 30 an error message indicating "There is a load unfixed to the vehicle. Fix the load to the vehicle firmly."

When receiving information indicating that a risky object is included in the load from the load information obtainer 12, for example, the control processor 16 may send the display 30 an error message indicating "A risky blade is loaded on the vehicle. Place the blade inside the vehicle, if possible."

<Route Information Retrieving Process by In-Vehicle Apparatus 1>

Figure 6:
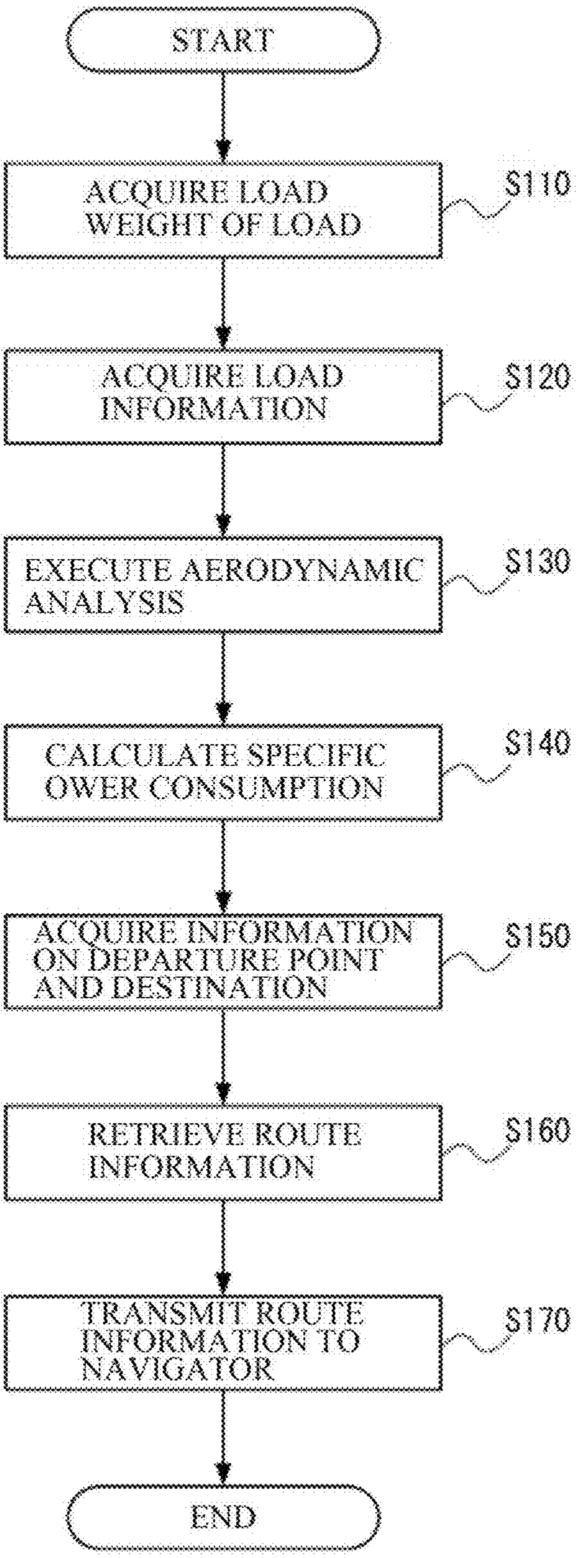
FIG. 6 is a flowchart of a route information retrieving process to be performed by the in-vehicle apparatus illustrated in FIG. 1.

A process adapted to retrieve the route information including the charging timing in the travel from the departure point to the destination to be performed by the in-vehicle apparatus 1 according to the first example embodiment will now be described with reference to FIG. 6.

The control processor 16 may send the instruction to acquire the load weight of the load to the load weight information obtainer 11 to cause the load weight information obtainer 11 to acquire the load weight of the load (Step S110).

The control processor 16 may send the instruction to acquire the load information to the load information obtainer 12 to cause the load information obtainer 12 to acquire the load information (Step S120).

The control processor 16 may transmit the load information acquired in Step S120 to the aerodynamic analyzer 13 to cause the aerodynamic analyzer 13 to execute the aerodynamic analysis (Step S130).

The control processor 16 may transmit the load weight acquired in Step S110 and the result of the aerodynamic analysis acquired in Step S130 to the specific power consumption calculator 14 to cause the specific power consumption calculator 14 to calculate the specific power consumption (Step S140).

The control processor 16 may acquire the information on the departure point and the destination from the navigator 100 (Step S150).

The control processor 16 may transmit the specific power consumption acquired in Step S140 and the information on the departure point and the destination acquired in Step S150 to the route information retriever 15 to cause the route information retriever 15 to retrieve the route information (Step S160).

The control processor 16 may transmit the route information retrieved in Step S160 to the navigator 100 (Step S170), and end the process.

<Error Message Display Process by In-Vehicle Apparatus 1>

Figure 7:
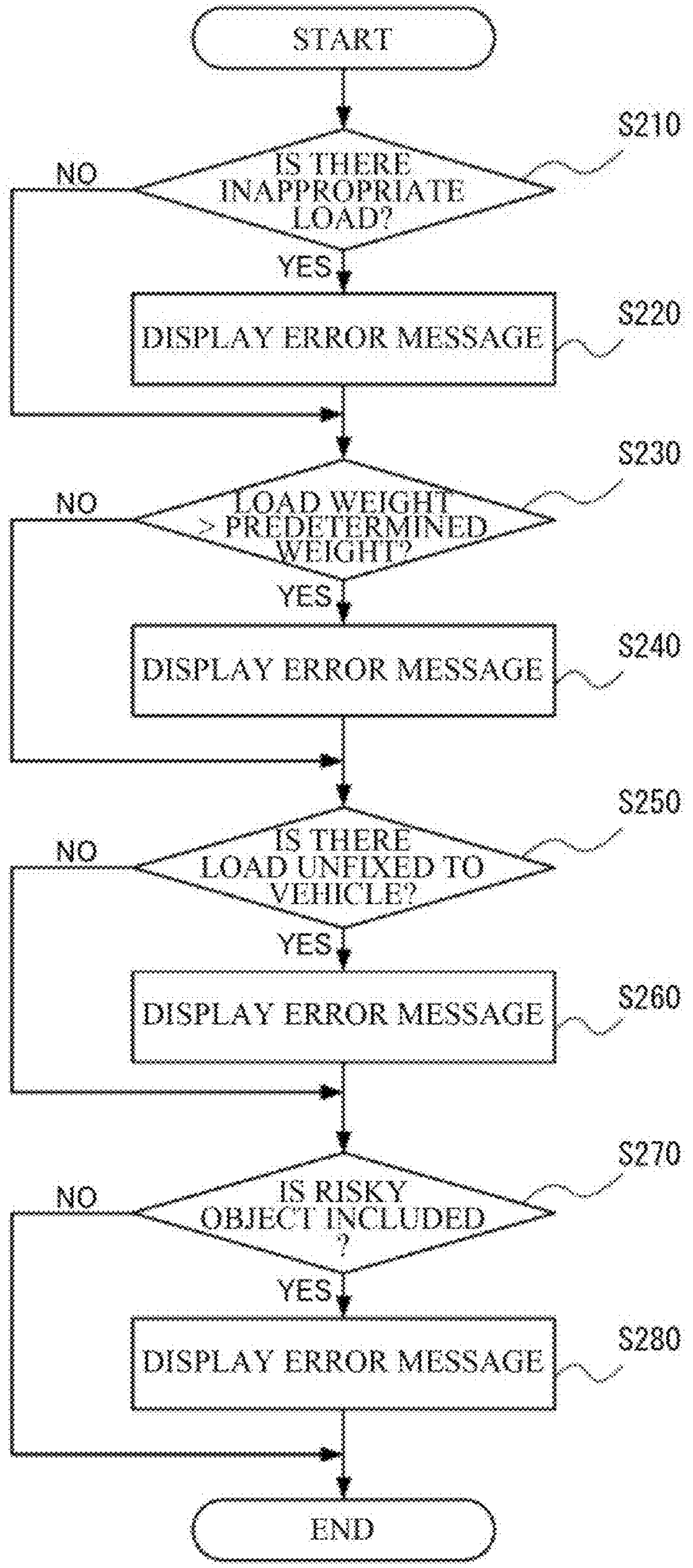
FIG. 7 is a flowchart of an error message display process to be performed by the in-vehicle apparatus illustrated in FIG. 1.

A process adapted to display an error message to be performed by the in-vehicle apparatus 1 according to the first example embodiment will now be described with reference to FIG. 7.

The control processor 16 may determine whether the result of the analysis indicating that the size or the shape of the load is inappropriate has been received from the aerodynamic analyzer 13 (Step S210).

For example, the control processor 16 may determine whether the result of the analysis indicating that one or more of the frontal projected area, the side projected area, and the height of the load are inappropriate has been received from the aerodynamic analyzer 13.

When determining that the result of the analysis indicating that the size or shape of the load is inappropriate has not been received from the aerodynamic analyzer 13 (Step S210: NO), the control processor 16 may cause the process to proceed to Step S230.

When determining that the result of the analysis indicating that the size or shape of the load is inappropriate has been received from the aerodynamic analyzer 13 (Step S210: YES), the control processor 16 may cause the display 30 to display an error message in accordance with the result of the analysis received from the aerodynamic analyzer 13 (Step S220), and cause the process to proceed to Step S230.

The control processor 16 may determine whether the load weight of the load acquired from the load weight information obtainer 11 is greater than the predetermined weight (Step S230).

When determining that the load weight of the load acquired from the load weight information obtainer 11 is not greater than the predetermined weight (Step S230: NO), the control processor 16 may cause the process to proceed to Step S250.

When determining that the load weight of the load acquired from the load weight information obtainer 11 is greater than the predetermined weight (Step S230: YES), the control processor 16 may cause the display 30 to display an error message (Step S240) and cause the process to proceed to Step S250.

The control processor 16 may determine whether the information indicating that there is a load unfixed to the vehicle has been received from the load information obtainer 12 (Step S250).

When determining that the information indicating that there is a load unfixed to the vehicle has not been received from the load information obtainer 12 (Step S250: NO), the control processor 16 may cause the process to proceed to Step S270.

When determining that the information indicating that there is a load unfixed to the vehicle has been received from the load information obtainer 12 (Step S250: YES), the control processor 16 may cause the display 30 to display an error message (Step S260), and cause the process to proceed to Step S270.

The control processor 16 may determine whether the information indicating that a risky object is included in the load has been received from the load information obtainer 12 (Step S270).

When determining that the information indicating that a risky object is included in the load has not been received from the load information obtainer 12 (Step S270: NO), the control processor 16 may end the process.

When determining that the information indicating that a risky object is included in the load has been received from the load information obtainer 12 (Step S270: YES), the control processor 16 may cause the display 30 to display an error message (Step S280), and end the process.

<Workings and Effects>

As described above, the in-vehicle apparatus 1 according to the first example embodiment includes the load weight information obtainer 11, the load information obtainer 12, the aerodynamic analyzer 13, the specific power consumption calculator 14, and the route information retriever 15. The load weight information obtainer 11 acquires the load weight of the load. The load information obtainer 12 acquires the size and shape of the load from the image data. The aerodynamic analyzer 13 executes the aerodynamic analysis based on the acquired load information. The specific power consumption calculator 14 calculates the specific power consumption based on the load weight and the result of the analysis by the aerodynamic analyzer 13. The route information retriever 15 retrieves the route information including the charging timing in the travel from the departure point to the destination, based on the current amount of charge and the result of the calculation by the specific power consumption calculator 14.

That is, the in-vehicle apparatus 1 calculates the specific power consumption based on the load weight of the load placed on the roof rail or roof carrier of the vehicle and the size and shape of the load, and retrieves the route information including the charging timing in the travel from the departure point to the destination, based on the calculated specific power consumption.

Accordingly, the in-vehicle apparatus 1 makes it possible to calculate the specific power consumption taking into consideration the deterioration in specific power consumption caused by the load placed on the vehicle. It is therefore possible for the in-vehicle apparatus 1 to present the user with the route information including the charging timing in the travel from the departure point to the destination.

Being given with the route information including the accurate charging timing, the user makes it possible to enjoy stress-free safety driving to the destination.

According to the first example embodiment, the aerodynamic analyzer 13 of the in-vehicle apparatus 1 may determine the level of deterioration in specific power consumption based on the frontal projected area Sz and the side projected area Ss of the load, for example.

That is, the aerodynamic analyzer 13 may determine the level of deterioration in specific power consumption taking into consideration an increase in aerodynamic drag caused by the load.

Accordingly, the aerodynamic analyzer 13 makes it possible to accurately determine the level of deterioration in specific power consumption.

According to the first example embodiment, the specific power consumption calculator 14 of the in-vehicle apparatus 1 may calculate the specific power consumption based on the load weight of the load acquired from the load weight information obtainer 11 and the level of deterioration in specific power consumption acquired from the aerodynamic analyzer 13.

That is, the specific power consumption calculator 14 makes it possible to accurately calculate the specific power consumption, taking into consideration the deterioration in specific power consumption caused by the load weight of the load and an increase in aerodynamic drag of the load.

Being given with the route information including the accurate charging timing, the user makes it possible to enjoy stress-free safety driving to the destination.

According to the first example embodiment, an error message may be displayed on the display 30 of the in-vehicle apparatus 1 when the size or shape of the load is determined to be inappropriate based on the result of the analysis by the aerodynamic analyzer 13.

A lateral force that can cause a rollover accident of the vehicle increases in proportion to the side projected area Ss of the load.

Accordingly, when receiving the result of the analysis indicating that the side projected area is inappropriate from the aerodynamic analyzer 13, for example, the control processor 16 of the in-vehicle apparatus 1 may cause the display 30 to display an error message to alert the user to the possibility of occurrence of a rollover accident of the vehicle.

The in-vehicle apparatus 1 therefore helps to avoid the occurrence of a rollover accident or the like.

According to the first example embodiment, when determining that the height of the load is greater than the predetermined height based on the load information received from the load information obtainer 12, the control processor 16 of the in-vehicle apparatus 1 may cause the display 30 to display an error message.

A yawing moment that can cause unstable traveling of the vehicle increases in proportion to the square of the height of the load.

Accordingly, when receiving the result of the analysis indicating that the height of the load is inappropriate from the aerodynamic analyzer 13, for example, the control processor 16 of the in-vehicle apparatus 1 may cause the display 30 to display an error message to alert the user to the possibility of occurrence of a rollover accident of the vehicle.

The in-vehicle apparatus 1 therefore helps to avoid the occurrence of a rollover accident or the like.

According to the first example embodiment, the control processor 16 of the in-vehicle apparatus 1 may cause the display 30 to display an error message when receiving the information indicating that there is a load unfixed to the vehicle from the load information obtainer 12.

That is, when detecting a load that can fall from the vehicle during traveling of the vehicle, the in-vehicle apparatus 1 may cause the display 30 to display an error message to alert the user to the possibility of occurrence of a fall of the load from the vehicle.

The in-vehicle apparatus 1 therefore helps to avoid the occurrence of the fall of the load during traveling of the vehicle.

According to the first example embodiment, the control processor 16 of the in-vehicle apparatus 1 may cause the display 30 to display an error message when receiving the information indicating that a risky object is included in the load from the load information obtainer 12.

It is therefore possible for the in-vehicle apparatus 1 to alert the user to the risky object loaded on the vehicle.

According to the first example embodiment, the control processor 16 of the in-vehicle apparatus 1 may cause the display 30 to display the rate of deterioration in specific power consumption caused by the load.

That is, the in-vehicle apparatus 1 may notify the user of the rate of deterioration in specific power consumption before the vehicle starts traveling to the destination.

This allows the user to adjust the weight, size, shape, and the like of the load to reduce the rate of deterioration in specific power consumption of the vehicle.

Second Example Embodiment

An in-vehicle apparatus 1A according to a second example embodiment will now be described with reference to FIGS. 8 to 10.

Note that elements denoted with the same reference numerals as those in the first example embodiment have the same functions as those in the first example embodiment, and a detailed description thereof is thus omitted herein.

<Configuration of In-Vehicle Apparatus 1A>

Figure 8:
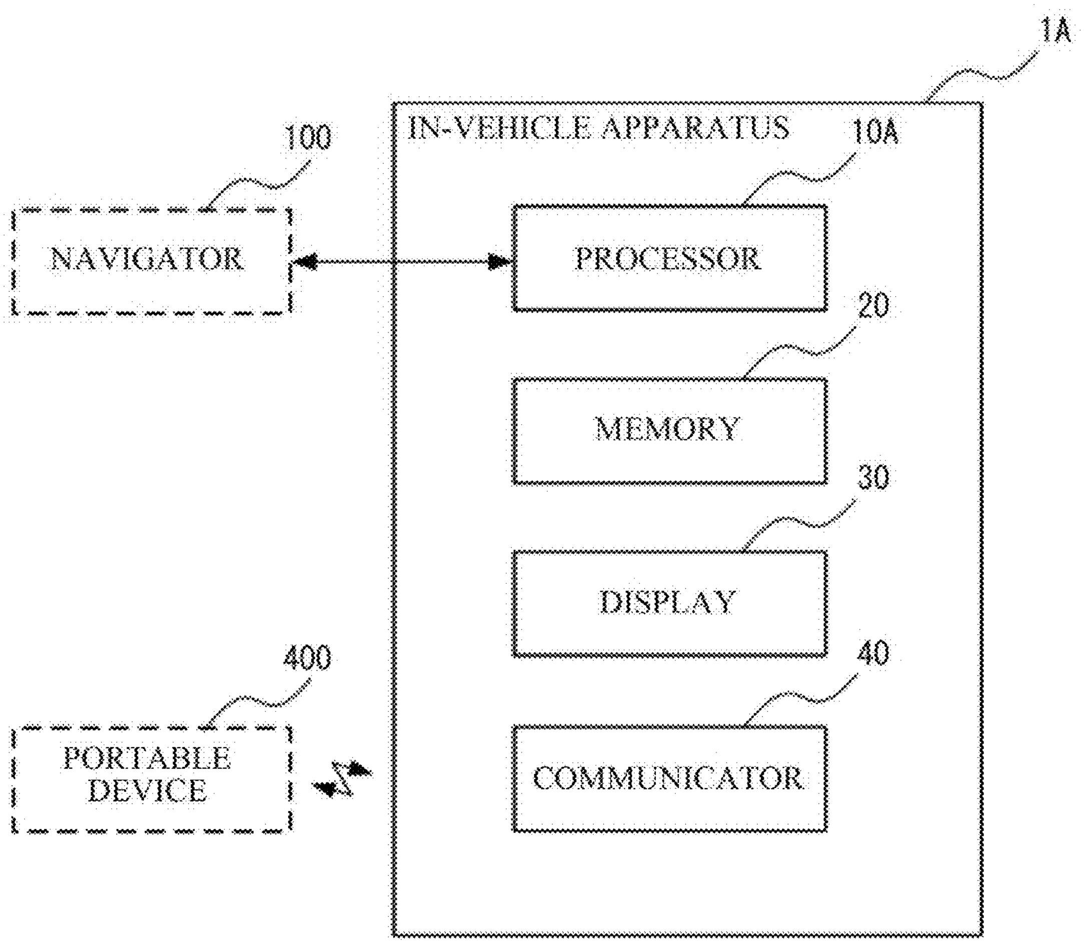
FIG. 8 is a block diagram illustrating a configuration of an in-vehicle apparatus according to one example embodiment of the disclosure.

As illustrated in FIG. 8, the in-vehicle apparatus 1A according to the second example embodiment may include a processor 10A, the memory 20, the display 30, and a communicator 40.

The communicator 40 may communicate with a portable device 400 owned by the user under the control by the processor 10A.

Non-limiting examples of the portable device 400 may include a smartphone and a tablet.

The communicator 40 may be, for example, a communication device using near-field wireless communication such as the Bluetooth (registered trademark). The communicator 40 may be communicably coupled to the portable device 400 to transmit and receive data therebetween.

The communicator 40 may transmit and receive data under the control by the processor 10A.

In the second example embodiment, the communicator 40 may receive a load image of the load captured by the portable device 400.

In the second example embodiment, the communicator 40 may send a message requesting to provide the load image to the portable device 400.

<Configuration of Processor 10A>

Figure 9:
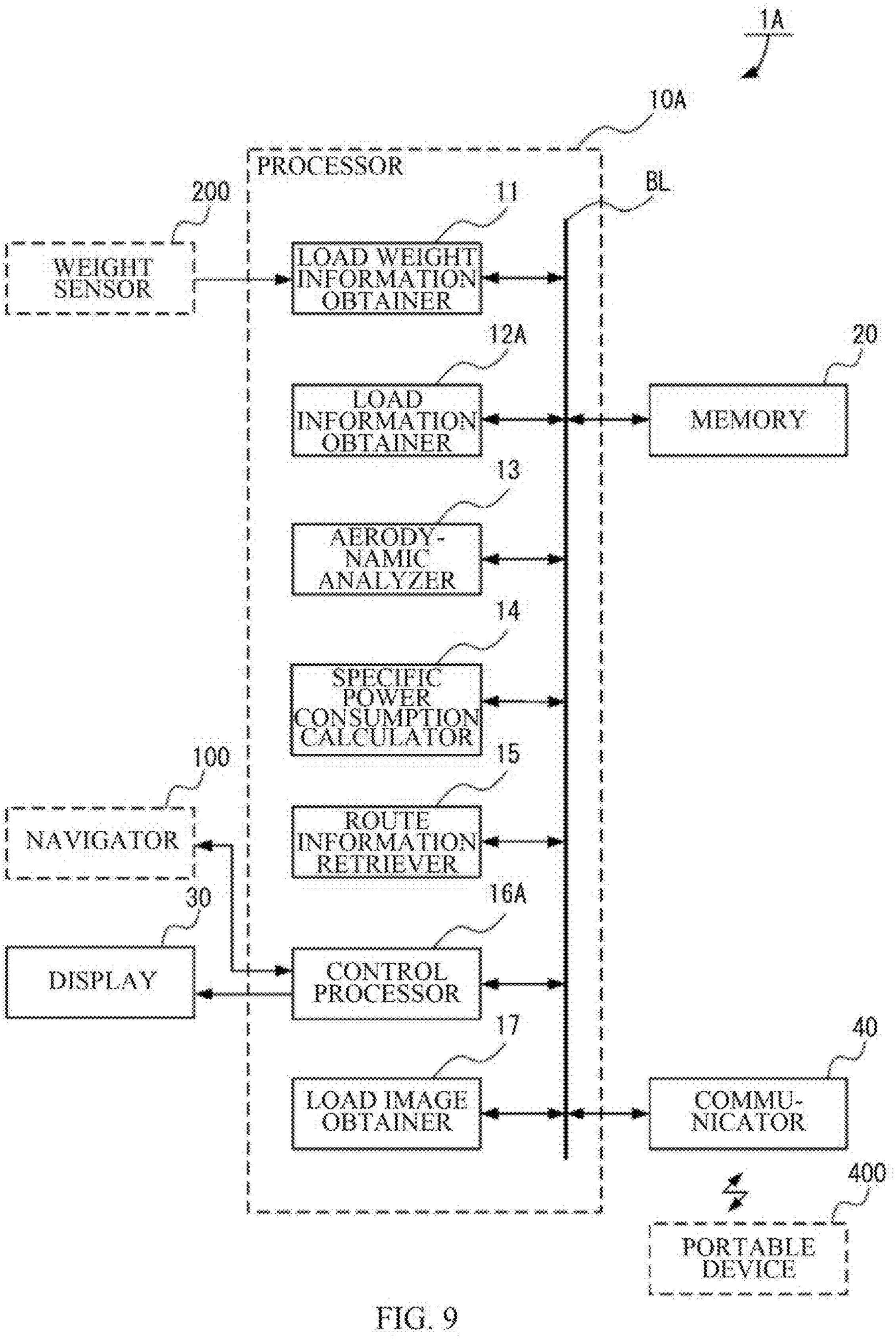
FIG. 9 is a block diagram illustrating a configuration of a processor in the in-vehicle apparatus illustrated in FIG. 8.
Figure 10:
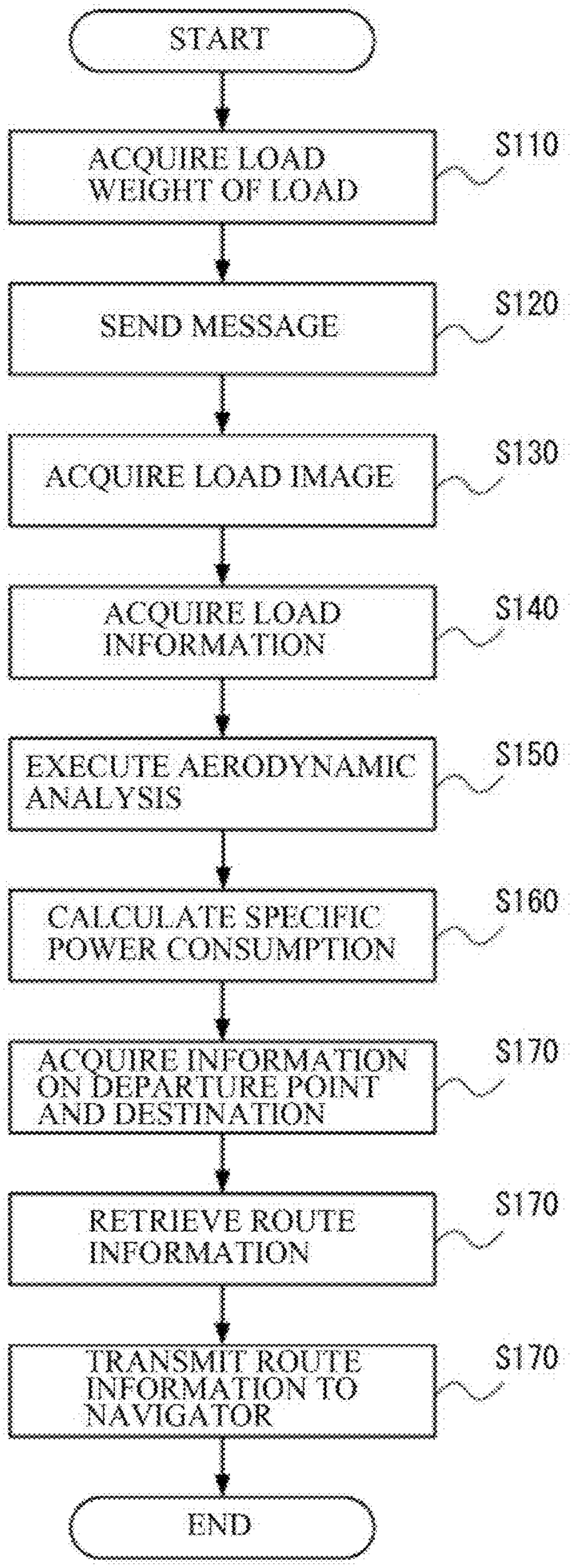
FIG. 10 is a flowchart of a route information retrieving process to be performed by the in-vehicle apparatus illustrated in FIG. 8.

As illustrated in FIG. 9, the processor 10A may include the load weight information obtainer 11, a load information obtainer 12A, the aerodynamic analyzer 13, the specific power consumption calculator 14, the route information retriever 15, a control processor 16A, and a load image obtainer 17.

These components of the processor 10A and the memory 20 may transmit and receive various kinds of data therebetween via the bus line BL.

The load information obtainer 12A may acquire the size and shape of the load from the load image acquired by the load image obtainer 17 to be described later.

The load information obtainer 12A may transmit the acquired load information to the control processor 16A, which will be described later, via the bus line BL.

The control processor 16A may control an overall operation of the in-vehicle apparatus 1A in accordance with the control program stored in the memory 20.

In the second example embodiment, the control processor 16A may transmit the load image received from the load image obtainer 17, which will be described later, to the load information obtainer 12A via the bus line BL, for example, to cause the load information obtainer 12A to acquire the load information.

In the second example embodiment, the control processor 16A may transmit the load information received from the load information obtainer 12A to the aerodynamic analyzer 13 via the bus line BL, for example, to cause the aerodynamic analyzer 13 to execute the aerodynamic analysis.

In the second example embodiment, the control processor 16A may send the instruction to acquire the load image from the portable device 400 to the load image obtainer 17 via the bus line BL, for example.

When sending the load image obtainer 17 the instruction to acquire the load image from the portable device 400, the control processor 16A may send the message requesting to provide the load image to the portable device 400 via the communicator 40.

For example, the control processor 16A may send a message indicating "The specific power consumption of the vehicle can be largely deteriorated due to an influence of the load. Capture images of the load on the vehicle from front, rear, right, and left directions of the vehicle to calculate the deterioration in specific power consumption."

The load image obtainer 17 may acquire the load image captured by the portable device 400.

The load image obtainer 17 may acquire the load image of the load captured by the portable device 400 via the communicator 40.

The load image obtainer 17 may transmit the acquired load image to the control processor 16A via the bus line BL.

<Route Information Retrieving Process by In-Vehicle Apparatus 1A>

A process adapted to retrieve the route information including the charging timing in the travel from the departure point to the destination to be performed by the in-vehicle apparatus 1A according to the second example embodiment will now be described with reference to FIG. 10.

The control processor 16A may send the instruction to acquire the load weight of the load to the load weight information obtainer 11 to cause the load weight information obtainer 11 to acquire the load weight of the load (Step S310).

The control processor 16A may send the message requesting to provide the load image to the portable device 400 via the communicator 40 (Step S320).

The control processor 16A may send the instruction to acquire the load image to the load image obtainer 17 to cause the load image obtainer 17 to acquire the load image of the load from the portable device 400 (Step S330).

The control processor 16A may transmit the load image acquired in Step S330 to the load information obtainer 12A to cause the load information obtainer 12A to acquire the load information (Step S340).

The control processor 16A may transmit the load information acquired in Step S340 to the aerodynamic analyzer 13 to cause the aerodynamic analyzer 13 to execute the aerodynamic analysis (Step S350).

The control processor 16A may transmit the load weight acquired in Step S310 and the result of the aerodynamic analysis acquired in Step S350 to the specific power consumption calculator 14 to cause the specific power consumption calculator 14 to calculate the specific power consumption (Step S360).

The control processor 16A may acquire the information on the departure point and the destination from the navigator 100 (Step S370).

The control processor 16A may transmit the specific power consumption acquired in Step S360 and the information on the departure point and the destination acquired in Step S370 to the route information retriever 15 to cause the route information retriever 15 to retrieve the route information (Step S380).

The control processor 16A may transmit the route information retrieved in Step S380 to the navigator 100 (Step S390), and end the process.

<Workings and Effects>

As described above, the in-vehicle apparatus 1A according to the second example embodiment may include the load image obtainer 17 that incorporates the load image captured by the portable device 400.

The load information obtainer 12A may acquire the size and shape of the load from the load image incorporated by the load image obtainer 17.

The portable device 400 may be configured to capture an image of the load at an angle and in a scale that are freely selected.

When the load placed on the vehicle is a long lumber such as a boat, for example, it is difficult for an imager disposed in the vehicle to capture an image of the entire load; therefore, the portable device 400 owned by the user may be used to acquire the load image.

The portable device 400 makes it possible to capture an image of the load from an angle at which the imager disposed on the vehicle finds it difficult to capture an image, such as a bird's-eye view of the load.

This enables the in-vehicle apparatus 1A to acquire the load information based on the load image covering the entire load. It is therefore possible to accurately determine driving stability.

The in-vehicle apparatus 1A according to the second example embodiment may include the communicator 40 that communicates with the portable device 400.

The communicator 40 may send the message requesting to provide the load image to the portable device 400 under the control by the control processor 16A.

For example, the control processor 16A may send a message indicating "The specific power consumption of the vehicle can be largely deteriorated due to an influence of the load. Capture images of the entire load on the vehicle from front, rear, right, left, and upper directions of the vehicle to calculate the deterioration in specific power consumption."

In this way, the in-vehicle apparatus 1A makes it possible to notify the user of a possible deterioration in specific power consumption caused by the loading way, and acquire the load image from the user.

The in-vehicle apparatus 1A according to the second example embodiment may retrieve the route information including the charging timing in the travel from the departure point to the destination, based on the load image acquired by the portable device 400.

It is therefore possible for the in-vehicle apparatus 1A to present the user with the route information determined taking into consideration the deterioration in specific power consumption caused by the load placed on the vehicle during traveling of the vehicle.

Being given with the route information including the accurate charging timing, the user makes it possible to enjoy stress-free safety driving to the destination.

Third Example Embodiment

An in-vehicle apparatus 1B according to a third example embodiment will now be described with reference to FIGS. 11 to 14.

Note that elements denoted with the same reference numerals as those in the first and second example embodiments have the same functions as those in the first and second example embodiments, and a detailed description thereof is thus omitted herein.

<Configuration of In-Vehicle Apparatus 1B>

Figure 11:
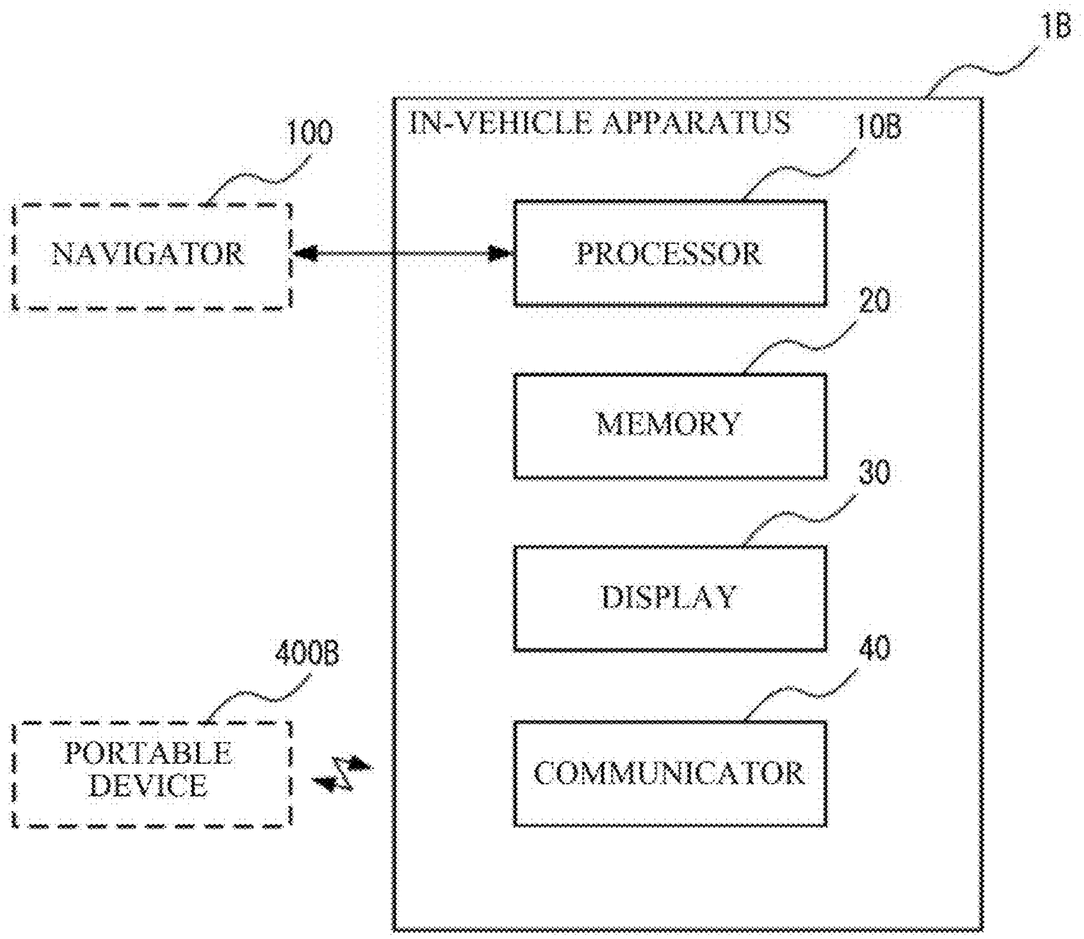
FIG. 11 is a block diagram illustrating a configuration of an in-vehicle apparatus according to one example embodiment of the disclosure.

As illustrated in FIG. 11, the in-vehicle apparatus 1B according to the third example embodiment may include a processor 10B, the memory 20, the display 30, and the communicator 40.

In the third example embodiment, the processor 10B may calculate the specific power consumption of the vehicle based on the load weight and the load image received from the portable device 400B, for example.

In the third example embodiment, the processor 10B may retrieve the route information including the charging timing in the travel from the departure point to the destination, based on the calculated specific power consumption and the information on the departure point and the destination acquired from the navigator 100, for example.

In the third example embodiment, the processor 10B may transmit the retrieved route information to the navigator 100.

When receiving the route information from the processor 10B, the navigator 100 may perform the route guidance from the departure point to the destination and the guidance on power charging based on the route information received from the processor 10B.

A configuration of the processor 10B will be described later.

The portable device 400B may be, for example, a smartphone owned by the user. The portable device 400B may execute application programs downloaded in the smartphone.

In the third example embodiment, the portable device 400B may execute an application program adapted to capture and transmit the load image.

For example, the user may download the application program adapted to capture the load image from the server coupled to the Internet in advance, and store the application program in the portable device 400B.

In the third example embodiment, the portable device 400B may start up the application program when receiving an instruction to acquire the load image from the in-vehicle apparatus 1B, for example.

In the third example embodiment, the portable device 400B may transmit the captured load image to the in-vehicle apparatus 1B, for example.

A configuration of the portable device 400B will be described later.

<Configuration of Processor 10B>

Figure 12:
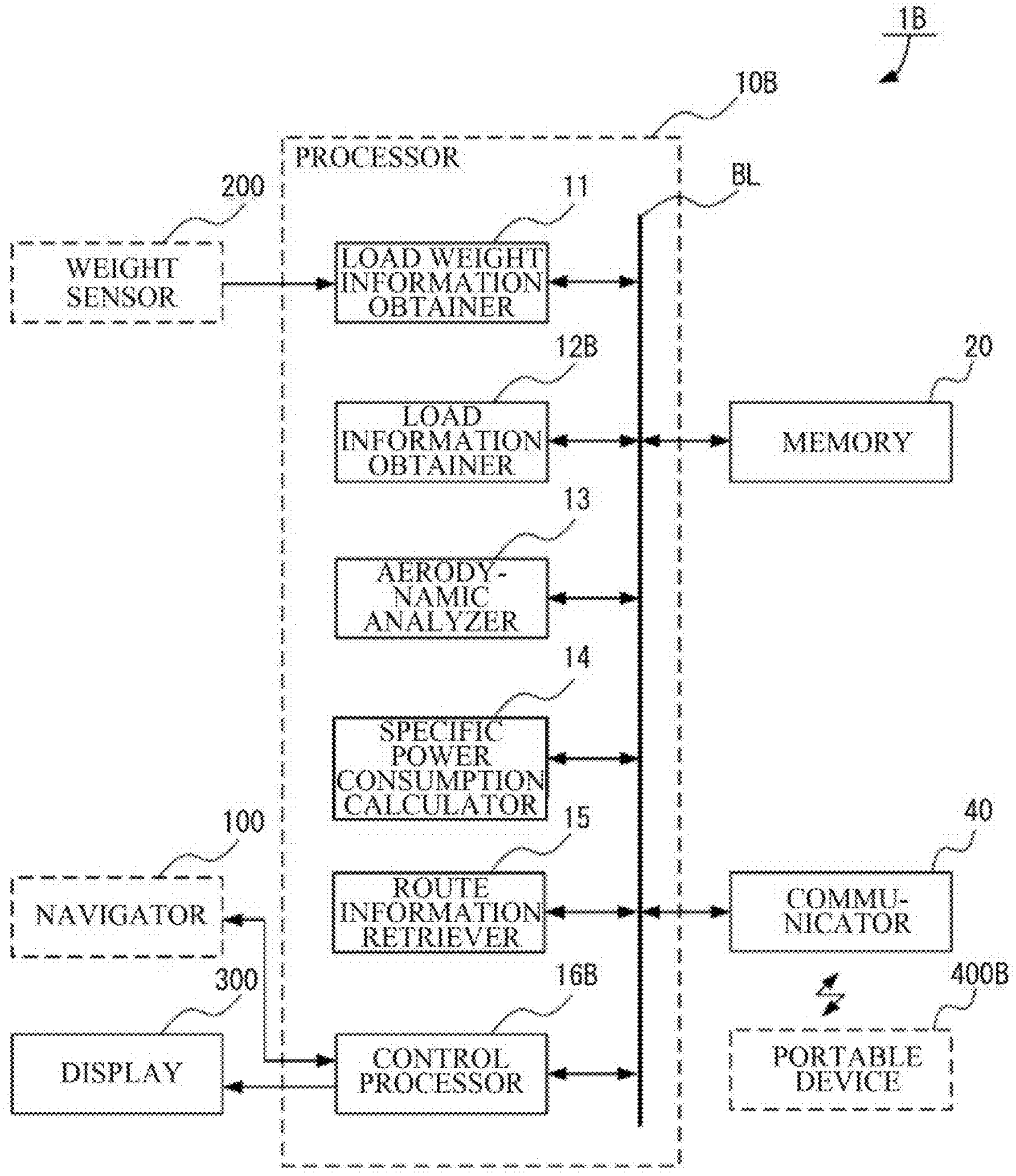
FIG. 12 is a block diagram illustrating a configuration of a processor in the in-vehicle apparatus illustrated in FIG. 11.

As illustrated in FIG. 12, the processor 10B may include the load weight information obtainer 11, a load information obtainer 12B, the aerodynamic analyzer 13, the specific power consumption calculator 14, the route information retriever 15, and a control processor 16B.

These components of the processor 10B and the memory 20 may transmit and receive various kinds of data therebetween via the bus line BL.

In the third example embodiment, the load information obtainer 12B may acquire the load information from the load image of the load captured by the portable device 400B, for example.

In the third example embodiment, the load information obtainer 12B may receive the load image captured by the portable device 400B from the control processor 16B to be described later, and acquire the load information based on the received load image, for example.

The load information obtainer 12B may transmit the acquired load information to the control processor 16B, which will be described later, via the bus line BL.

The control processor 16B may control an overall operation of the in-vehicle apparatus 1B in accordance with the control program stored in the memory 20.

In the third example embodiment, the control processor 16B may send the instruction to capture the load image to the portable device 400B via the communicator 40, for example.

The control processor 16B may receive the load image from the portable device 400B via the communicator 40.

In the third example embodiment, the control processor 16B may transmit the load image received from the portable device 400B to the load information obtainer 12B via the bus line BL, for example, to cause the load information obtainer 12B to acquire the load information.

In the third example embodiment, the control processor 16B may transmit the load information received from the load information obtainer 12B to the aerodynamic analyzer 13 via the bus line BL, for example, to cause the aerodynamic analyzer 13 to execute the aerodynamic analysis.

In the third example embodiment, the control processor 16B may transmit the current residual amount of charge of the accumulator battery, the information on the departure point and the destination, and the specific power consumption received from the specific power consumption calculator 14 to the route information retriever 15 via the bus line BL, for example, to cause the route information retriever 15 to retrieve the route information.

In the third example embodiment, the control processor 16B may transmit the route information received from the route information retriever 15 to the navigator 100.

<Configuration of Portable Device 400B>

Figure 13:
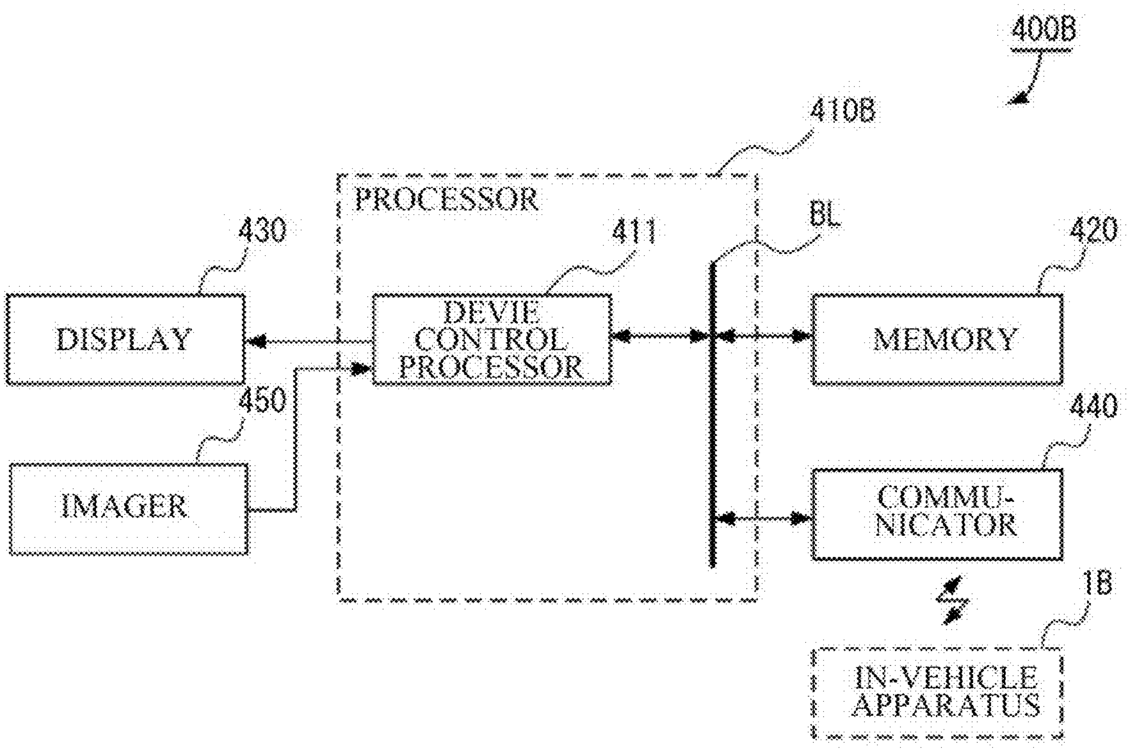
FIG. 13 is a block diagram illustrating a configuration of a portable device communicating with the in-vehicle apparatus illustrated in FIG. 11.

As illustrated in FIG. 13, the portable device 400B may include a processor 410, a memory 420, a display 430, a communicator 440, and an imager 450.

In the third example embodiment, the processor 410 may cause the imager 450 to capture a load image of the load when receiving the instruction to acquire a load image from the in-vehicle apparatus 1B.

The processor 410 may transmit the captured load image to the in-vehicle apparatus 1B via the communicator 440.

A configuration of the processor 410 will be described later.

The memory 420 may include a non-illustrated read only memory (ROM) and a non-illustrated random access memory (RAM).

In the third example embodiment, the memory 420 may store a control program and various kinds of data received from the processor 410, for example.

The memory 420 may store an application program adapted to capture a load image and transmit the load image.

The display 430 may be, for example, a display panel such as a liquid crystal display, and may display information received from the processor 410.

The communicator 440 may be, for example, a communication device using near-field wireless communication such as the Bluetooth (registered trademark).

The communicator 440 may be communicably coupled to the in-vehicle apparatus 1B to transmit and receive data therebetween.

The imager 450 may be, for example, a camera built in the portable device 400. The imager 450 may include an imaging device such as a charge coupled device (CCD).

The imager 450 may transmit the captured image to the processor 410.

In the third example embodiment, the imager 450 may capture a load image of the load, for example.

The imager 450 may transmit the load image to the processor 410.

<Configuration of Processor 410>

As illustrated in FIG. 13, the processor 410 may include a device control processor 411.

The device control processor 411 and the memory 420 may transmit and receive various kinds of data therebetween via the bus line BL.

The device control processor 411 may control an overall operation of the portable device 400B in accordance with the control program stored in the memory 420 and the application program adapted to capture and transmit the load image.

In the third example embodiment, the device control processor 411 may cause the display 430 to display the instruction to capture the load image, the method of capturing the load image, and a sample of the load image in accordance with the application program, for example.

For instance, the device control processor 411 may cause the display 430 to display the instruction to capture the load image, the method of capturing the load image, and the sample of the load image when receiving the instruction to acquire the load image from the in-vehicle apparatus 1B via the communicator 440.

In the third example embodiment, the device control processor 411 may transmit the load image captured by the imager 450 to the in-vehicle apparatus 1B in accordance with the application program.

<Process by In-Vehicle Apparatus 1B and Portable Device 400B>

A flow of a process to be performed by the in-vehicle apparatus 1B and the portable device 400B will now be described with reference to FIG. 14.

Figure 14:
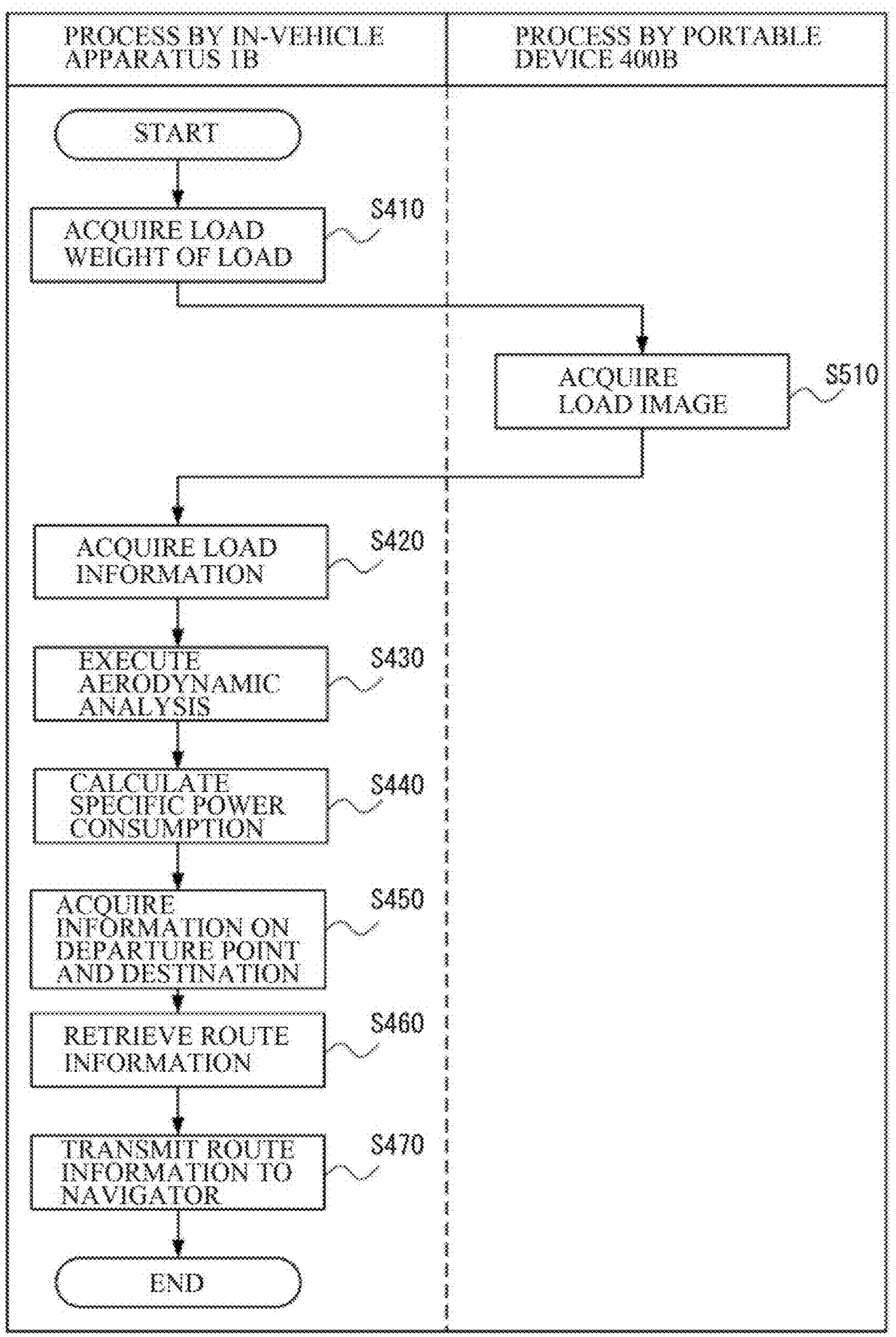
FIG. 14 is a route information retrieving process to be performed by the in-vehicle apparatus illustrated in FIG. 11.

As illustrated in FIG. 14, the control processor 16B of the in-vehicle apparatus 1B may send the instruction to acquire the load weight to the load weight information obtainer 11 to cause the load weight information obtainer 11 to acquire the load weight of the load (Step S410).

The control processor 16B may send the instruction to acquire the load image of the load to the portable device 400B via the communicator 40.

The device control processor 411 of the portable device 400B may acquire the load image of the load from the imager 450, and transmit the acquired load image to the in-vehicle apparatus 1B (Step S510).

The control processor 16B may transmit the load image acquired in Step S510 to the load information obtainer 12B to cause the load information obtainer 12B to acquire the load information (Step S420).

The control processor 16B may transmit the load information acquired in Step S420 to the aerodynamic analyzer 13 to cause the aerodynamic analyzer 13 to execute the aerodynamic analysis (Step S430).

The control processor 16B may transmit the load weight acquired in Step S410 and the result of the aerodynamic analysis acquired in Step S430 to the specific power consumption calculator 14 to cause the specific power consumption calculator 14 to calculate the specific power consumption (Step S440).

The control processor 16B may acquire the information on the departure point and the destination from the navigator 100 (Step S450).

The control processor 16B may transmit the specific power consumption calculated in Step S440 and the information on the departure point and the destination acquired in Step S450 to the route information retriever 15 to cause the route information retriever 15 to retrieve the route information (Step S460).

The control processor 16B may transmit the route information retrieved in Step S460 to the navigator 100 (Step S470), and end the process.

<Workings and Effects>

As described above, the in-vehicle apparatus 1B according to the third example embodiment may acquire the load image of the load from the portable device 400B in which the application program adapted to acquire and transmit the load image is installed.

When receiving the instruction to acquire the load image from the in-vehicle apparatus 1B, the portable device 400B may cause the display 430 to display, for example, the instruction to capture the load image, the method of capturing the load image, and a sample of the load image in accordance with the application program.

In this way, the in-vehicle apparatus 1B makes it possible to notify the user of detailed notes about capturing the load image.

This enables the user to easily recognize the reference of the load image necessary to calculate the specific power consumption.

Further, the load image necessary to acquire the load information is surely obtainable if the user captures a load image in accordance with the instruction displayed on the display 430.

The portable device 400B may automatically transmit the captured load image to the in-vehicle apparatus 1B in accordance with the application program.

This saves the user's effort of transmitting the load image.

Fourth Example Embodiment

An in-vehicle apparatus 1C according to the fourth example embodiment will now be described with reference to FIGS. 15 to 18.

Note that elements denoted with the same reference numerals as those in the first to third example embodiments have the same functions as those in the first to third example embodiments, and a detailed description thereof is thus omitted herein.

<Configuration of In-Vehicle Apparatus 1C>

Figure 15:
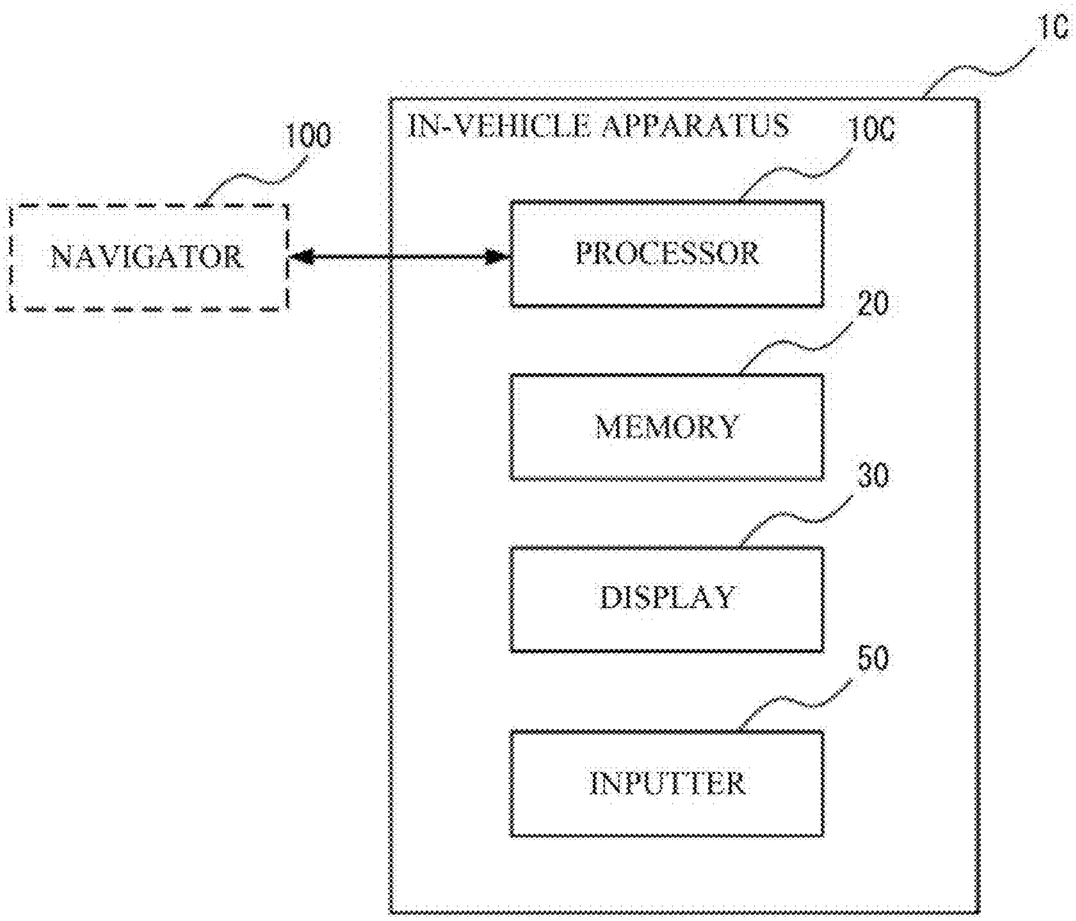
FIG. 15 is a block diagram of a configuration of an in-vehicle apparatus according to one example embodiment of the disclosure.

As illustrated in FIG. 15, the in-vehicle apparatus 1C according to the fourth example embodiment may include a processor 10C, the memory 20, the display 30, and an inputter 50.

In the fourth example embodiment, the processor 10C may calculate the specific power consumption of the vehicle based on the information on the load placed on the roof rail or roof carrier of the vehicle including the in-vehicle apparatus 1C.

The processor 10C may retrieve the route information including the charging timing in the travel from the departure point to the destination, based on the calculated specific power consumption and the information on the departure point and the destination acquired from the navigator 100, for example.

In the fourth example embodiment, the processor 10C may transmit the retrieved route information to the navigator 100.

When receiving the route information from the processor 10C, the navigator 100 may perform the route guidance from the departure point to the destination based on the received route information.

In the fourth example embodiment, the processor 10C may acquire the information on the shape and pieces of the load inputted with the inputter 50 to be described later.

In the fourth example embodiment, the processor 10C may cause the display 30 to display an appropriate loading way based on the type and the pieces of the load inputted by the user, for example.

A configuration of the processor 10C will be described later.

The inputter 50 may be, for example, an electrostatic capacitive touch panel disposed on a surface of a display panel of the display 30. The inputter 50 may acquire information inputted by the user.

In the fourth example embodiment, the inputter 50 may acquire the information on the shape and the pieces of the load inputted by the user, for example.

The inputter 50 may transmit the information on the shape and the pieces of the load to the processor 10C.

<Configuration of Processor 10C>

Figure 16:
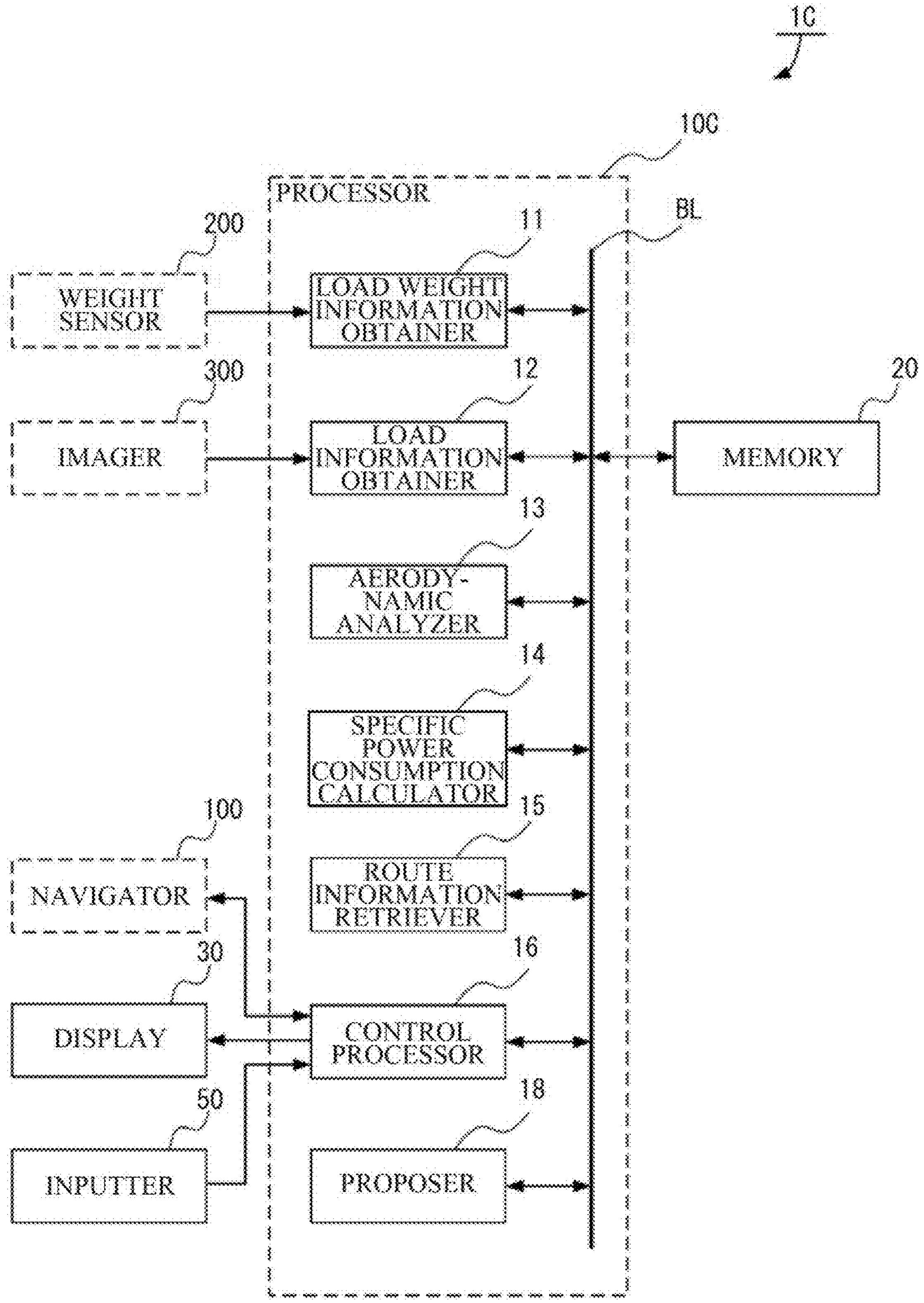
FIG. 16 is a block diagram illustrating a configuration of a processor in the in-vehicle apparatus illustrated in FIG. 15.

As illustrated in FIG. 16, the processor 10C may include the load weight information obtainer 11, the load information obtainer 12, the aerodynamic analyzer 13, the specific power consumption calculator 14, the route information retriever 15, a control processor 16C, and a proposer 18.

These components of the processor 10C and the memory 20 may transmit and receive various kinds of data therebetween via the bus line BL.

The control processor 16C may control an overall operation of the in-vehicle apparatus 1C in accordance with the control program stored in the memory 20.

In the fourth example embodiment, the control processor 16C may cause the display 30 to display an information input screen when the information on the shape and the pieces of the load is to be acquired.

Figure 17:
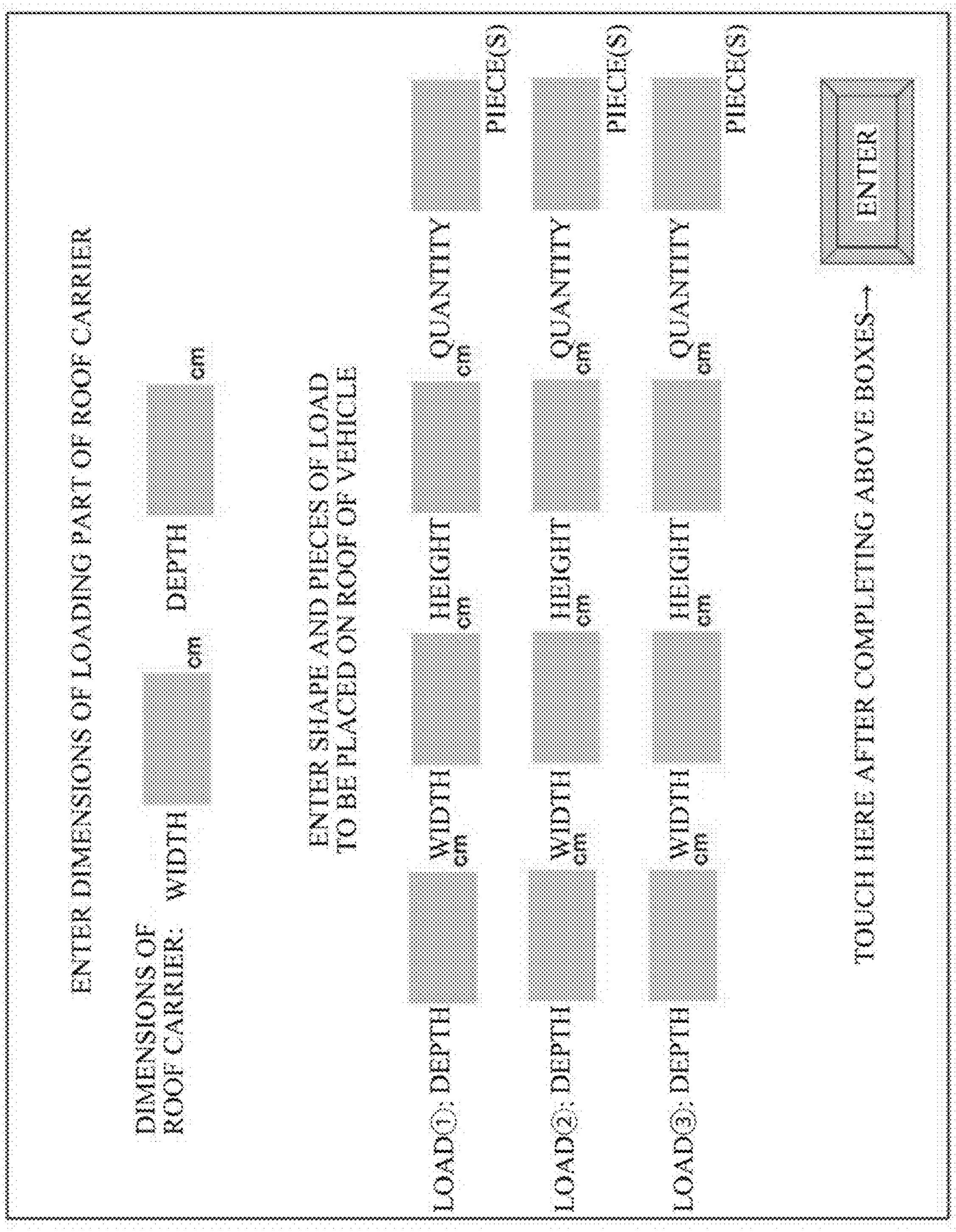
FIG. 17 is a diagram illustrating an example of a display of the in-vehicle apparatus illustrated in FIG. 15.

For example, the control processor 16C may cause the display 30 to display a screen illustrated in FIG. 17.

In the fourth example embodiment, the control processor 16C may acquire the size of a loading part of the roof carrier and the shape and the pieces of the load that are inputted by the user with the inputter 50, for example.

The control processor 16C may transmit the size of the loading part of the roof carrier and the shape and the pieces of the load to the proposer 18, which will be described later, via the bus line BL to cause the proposer 18 to determine an appropriate loading way.

The control processor 16C may cause the display 30 to display the appropriate loading way received from the proposer 18 to be described later.

For example, the control processor 16C may cause the display 30 to display image data indicating respective loading positions of the pieces of the load, for example.

Based on the input information acquired from the inputter 50, the proposer 18 may determine the appropriate loading way.

In the fourth example embodiment, the proposer 18 may calculate the loading way to minimize the frontal projected area Sz and the side projected area Ss based on the size of the loading part of the roof carrier and the shape and the pieces of the load that are received from the control processor 16C, for example.

In some embodiments, the proposer 18 may calculate the loading way to minimize the height of the load.

The proposer 18 may transmit information on the loading way to the control processor 16C via the bus line BL.

<Loading Way Proposal Process by In-Vehicle Apparatus 1C>

Figure 18:
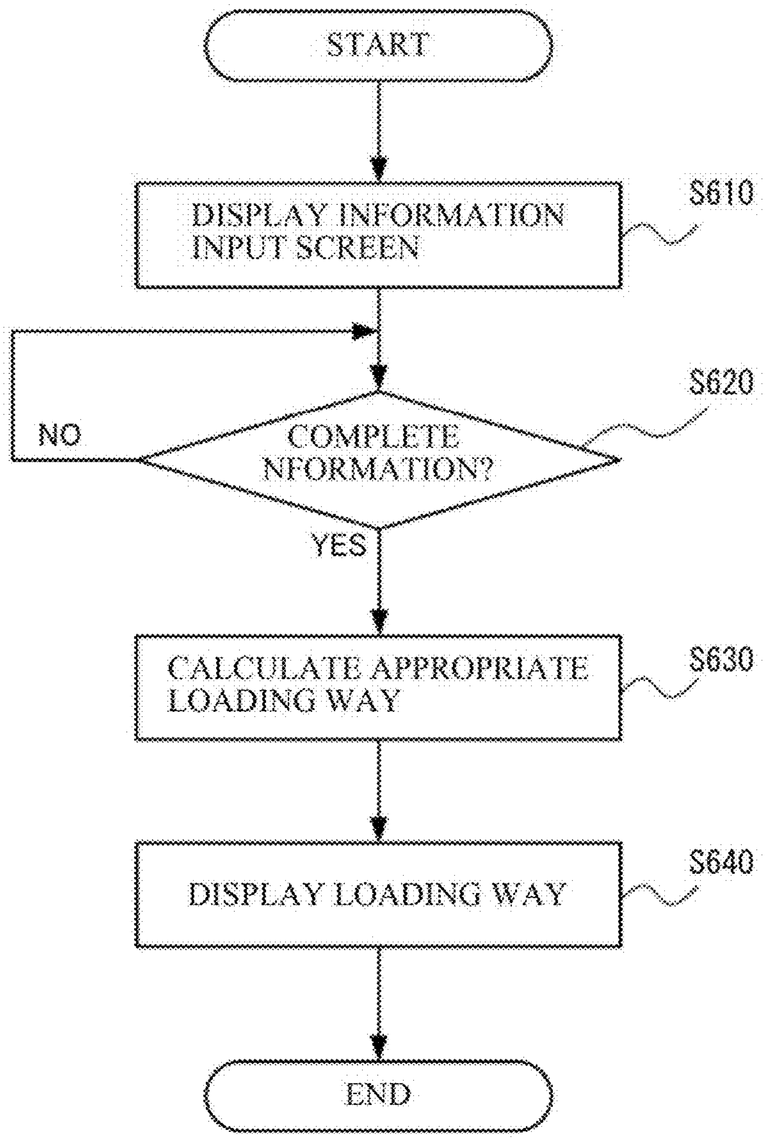
FIG. 18 is a flowchart of a loading way proposal process to be performed by the in-vehicle apparatus illustrated in FIG. 15.

A process adapted to propose the loading way to be performed by the in-vehicle apparatus 1C according to the fourth example embodiment will now be described with reference to FIG. 18.

The control processor 16C may cause the display 30 to display an information input screen on which the shape and the pieces of the load are to be inputted (Step S610).

The control processor 16C may determine whether the user has completed necessary information (Step S620).

When determining that the user has not completed the necessary information (Step S620: NO), the control processor 16C may return the process to a stand-by mode.

When determining that the user has completed the necessary information (Step S620: YES), the control processor 16C may cause the process to proceed to Step S630.

The control processor 16C may transmit the information on the load inputted by the user to the proposer 18 to cause the proposer 18 to calculate an appropriate loading way (Step S630).

The control processor 16C may cause the display 30 to display the appropriate loading way calculated in Step S630 (Step S640), and end the process.

<Workings and Effects>

As described above, the in-vehicle apparatus 1C according to the fourth example embodiment may include the inputter 50 and the proposer 18. The inputter 50 may acquire the information on the shape and the pieces of the load. Based on the input information inputted with the inputter 50, the proposer 18 may propose the appropriate loading way. The contents of the proposal may be displayed on the display 30.

That is, the in-vehicle apparatus 1C may acquire the information on the load to be placed on the vehicle from the user and propose the appropriate loading way to the user.

For example, the proposer 18 of the in-vehicle apparatus 1C may propose the loading way to minimize the frontal projected area Sz and the side projected area Ss to the user.

This reduces the deterioration in specific power consumption of the in-vehicle apparatus 1C caused by an increase in aerodynamic drag.

The loading way to minimize the frontal projected area Sz and the side projected area Ss may be an example of a loading way to place the load in the most stable manner.

The in-vehicle apparatus 1C therefore helps to avoid the occurrence of a fall of the load and the occurrence of a rollover accident of the vehicle during traveling.

With the respective loading positions of the pieces of the load being displayed on the display 30 in a visually recognizable manner, the user make it possible to easily place the load on the roof carrier.

Modification Example 1

In Modification Example 1, the in-vehicle apparatus 1A according to the example embodiment described above may acquire the load information based on both of the load image received from the portable device 400 and the load image captured by the camera installed in the vehicle when the load image received from the portable device 400 partially lacks, for example.

That is, when the load image captured by the user partially lacks, the in-vehicle apparatus 1A may cause the camera installed in the vehicle to capture the image of the lacking part of the load in order to complement the load image.

Accordingly, the load information obtainer 12A of the in-vehicle apparatus 1A may acquire the load information based on the complemented load image. It is therefore possible for the in-vehicle apparatus 1A to always acquire accurate load information.

Modification Example 2

In Modification Example 2, the in-vehicle apparatuses 1, 1A, 1B, and 1C according to the example embodiments described above may each cause the display 30 to display an actual specific power consumption together with the specific power consumption calculated by the specific power consumption calculator 14 when the vehicle reaches the destination, for example.

In this way, the in-vehicle apparatuses 1, 1A, 1B, and 1C makes it possible to demonstrate reliability of the calculated specific power consumption to the user.

Modification Example 3

In Modification Example 3, the in-vehicle apparatuses 1, 1A, 1B, and 1C according to the example embodiments described above may each determine the specific power consumption based on machine learning.

For example, the specific power consumption calculator 14 may determine the specific power consumption using a trained model based on teaching data including the load image and the information on the actual specific power consumption uploaded to the server by the user.

This enhances the accuracy in calculating the specific power consumption. It is therefore possible for the in-vehicle apparatuses 1, 1A, 1B, and 1C to present the user with the route information including the accurate charging timing in the travel from the departure point to the destination.

In some embodiments, the in-vehicle apparatus 1C according to the example embodiment described above may determine the appropriate loading way based on machine learning.

For example, the proposer 18 may determine the appropriate loading way using a trained model based on teaching data including the load image and the information on the actual specific power consumption uploaded to the server by the user.

In this way, the proposer 18 makes it possible to present the user with the appropriate loading way that avoids the deterioration in specific power consumption.

In some embodiments, the user who has uploaded the load image and the information on the actual specific power consumption to the server may be given with a reward.

This makes it possible to collect the load images and the information on the actual specific power consumption from a greater number of users, enhancing the accuracy of the trained model.

Modification Example 4

The preset information stored in the memory 20 of the in-vehicle apparatus 1 according to the example embodiment described above may be changed to facilitate mounting of the in-vehicle apparatus 1 on a gasoline-fueled vehicle or a hybrid vehicle.

For example, the reference specific power consumption and the rate of deterioration in specific power consumption stored in the preset information may be changed to a reference specific fuel consumption and a rate of deterioration in specific fuel consumption of a gasoline-fueled vehicle on which the in-vehicle apparatus 1 is mounted.

The specific power consumption calculator 14 may calculate a specific fuel consumption of the vehicle based on the reference specific fuel consumption and the rate of deterioration in specific fuel consumption acquired from the preset information, for example.

The route information retriever 15 may calculate the cruising range based on a current gasoline residual amount and the specific fuel consumption calculated by the specific power consumption calculator 14, for example.

The route information retriever 15 may retrieve the traveling route from the departure point to the destination via a gasoline filling facility located within the cruising range, based on the calculated cruising range, map information, information on locations of gasoline filling stations, and the information on the departure point and the destination.

This facilitates mounting of the in-vehicle apparatus 1 on the gasoline-fueled vehicle or the hybrid vehicle.

Modification Example 5

In Modification Example 5, the portable device 400B according to the example embodiment described above may acquire the load weight from the in-vehicle apparatus 1B and execute the process adapted to calculate the specific power consumption in accordance with an application program, for example.

That is, the portable device 400B may execute the process adapted to capture the load image, the process adapted to retrieve the load information from the captured load image, the process adapted to execute the aerodynamic analysis based on the load information and the load weight of the load, and the process adapted to calculate the specific power consumption based on the result of the aerodynamic analysis.

This reduces a processing load on the processor 10B of the in-vehicle apparatus 1B.

The reduction in the processing load on the processor 10B of the in-vehicle apparatus 1B leads to a reduction in the amount of electric consumption of the in-vehicle apparatus 1B.

In some embodiments, it is possible to implement the in-vehicle apparatus 1 of the example embodiment of the disclosure by recording the process to be executed by the load information obtainer 12, the aerodynamic analyzer 13, the specific power consumption calculator 14, the route information retriever 15, and the control processor 16 of the in-vehicle apparatus 1 on a non-transitory recording medium readable by a computer system, and causing the computer system to load the program recorded on the non-transitory recording medium onto the load information obtainer 12, the aerodynamic analyzer 13, the specific power consumption calculator 14, the route information retriever 15, and the control processor 16 of the in-vehicle apparatus 1 to execute the program.

The computer system as used herein may encompass an operating system (OS) and hardware such as a peripheral device.

In addition, when the computer system utilizes a World Wide Web (WWW) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above.

The program may be a so-called differential file (differential program) configured to implement the operation by a combination of a program already recorded on the computer system.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the load weight information obtainer 11, the load information obtainer 12, the aerodynamic analyzer 13, the specific power consumption calculator 14, and the route information retriever 15 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the load weight information obtainer 11, the load information obtainer 12, the aerodynamic analyzer 13, the specific power consumption calculator 14, and the route information retriever 15 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the load weight information obtainer 11, the load information obtainer 12, the aerodynamic analyzer 13, the specific power consumption calculator 14, and the route information retriever 15 illustrated in FIG. 2.

The invention claimed is:

1. An in-vehicle apparatus to be applied to a vehicle, the in-vehicle apparatus comprising circuitry configured to:

store preset information including a reference specific power consumption of the vehicle, a rate of deterioration in specific power consumption per load weight, a correlation between a frontal projected area and a level of deterioration in specific power consumption, a correlation between a side projected area and an adjustment value for the level of deterioration, and a correlation between the level of deterioration and a deterioration rate;

receive sensor data from a weight sensor disposed on a roof rail of the vehicle or a roof carrier of the vehicle;

calculate, based on the received sensor data, a load weight of a load placed on the roof rail or the roof carrier;

receive image data of the load from one or both of an imager disposed in the vehicle and a portable device;

calculate, based on the received image data, a frontal projected area of the load and a side projected area of the load;

determine a first deterioration rate caused by the load weight of the load based on the load weight of the load and the rate of deterioration in specific power consumption per load weight;

determine a second deterioration rate caused by an increase in aerodynamic drag based on the frontal projected area of the load and the side projected area of the load by determining, based on the correlation between the frontal projected area and the level of deterioration in specific power consumption, the level of deterioration corresponding to the frontal projected area, adjusting the level of deterioration based on the side projected area and the correlation between the side projected area and the adjustment value for the level of deterioration, and determining, based on the correlation between the level of deterioration and the deterioration rate, the second deterioration rate corresponding to the adjusted level of deterioration;

determine a total deterioration rate as a total value of the first deterioration rate and the second deterioration rate;

calculate a specific power consumption of the vehicle based on the reference specific power consumption of the vehicle and the total deterioration rate;

acquire, from a navigator, information on a departure point and a destination;

acquire a current residual amount of charge of an accumulator battery of the vehicle;

acquire map information and information on locations of power charging facilities;

generate route information including a charging timing in travel from the departure point to the destination based on the current residual amount of charge and the calculated specific power consumption by calculating a cruising range based on the current residual amount of charge and the calculated specific power consumption, and retrieving a traveling route from the departure point to the destination via a power charging facility located within the calculated cruising range, based on the calculated cruising range, the map information, the information on the locations of the power charging facilities, and the information on the departure point and the destination; and transmit the route information to the navigator to cause the navigator to display the route information, start route guidance from the departure point to the destination, and perform guidance on power charging based on the route information.

2. The in-vehicle apparatus according to claim 1, wherein the circuitry is further configured to:

communicate with the portable device; and send, to the portable device, a message requesting provision of the image data of the load.

3. The in-vehicle apparatus according to claim 1, further comprising a display configured to display information, wherein the circuitry is configured to, when the frontal projected area is greater than a first predetermined area or the side projected area is larger than a second predetermined area, cause the display to display an error message.

4. The in-vehicle apparatus according to claim 3, wherein the circuitry is further configured to:

acquire input information on a shape of the load and pieces of the load;

determine, based on the input information, an appropriate loading way that reduces one or both of the frontal projected area and the side projected area; and cause the display to display contents of the appropriate loading way.

5. The in-vehicle apparatus according to claim 1, wherein the specific power consumption indicates a travel distance per unit amount of electric power consumption; and wherein, in determining the second deterioration rate caused by the increase in aerodynamic drag, the circuitry is further configured to:

when (i) the side projected area is less than a first threshold and (ii) the frontal projected area is less than a second threshold, determine the second deterioration rate as a first value;

when (i) the side projected area is less than the first threshold and (ii) the frontal projected area is greater than or equal to the second threshold and less than a third threshold that is greater than the second threshold, determine the second deterioration rate as a second value;

when (i) the side projected area is less than the first threshold and (ii) the frontal projected area is greater than or equal to the third threshold, determine the second deterioration rate as a third value;

when (i) the side projected area is greater than or equal to the first threshold and (ii) the frontal projected area is less than the second threshold, determine the second deterioration rate as the second value;

when (i) the side projected area is greater than or equal to the first threshold and (ii) the frontal projected area is greater than or equal to the second threshold and less than the third threshold, determine the second deterioration rate as the third value;

when (i) the side projected area is greater than or equal to the first threshold and (ii) the frontal projected area is greater than or equal to the third threshold, determine the second deterioration rate as a fourth value;

wherein, in calculating the specific power consumption, the first value, the second value, the third value, and the fourth value are set so that the specific power consumption calculated based on the reference specific power consumption and the total deterioration rate is smaller when the second deterioration rate is the second value than when the second deterioration rate is the first value, smaller when the second deterioration rate is the third value than when the second deterioration rate is the second value, and smaller when the second deterioration rate is the fourth value than when the second deterioration rate is the third value.

6. An in-vehicle apparatus to be applied to a vehicle, the in-vehicle apparatus comprising:

one or more processors; and one or more memories communicably coupled to the one or more processors and configured to store preset information including a reference specific power consumption of the vehicle, a rate of deterioration in specific power consumption per load weight, a correlation between a frontal projected area and a level of deterioration in specific power consumption, a correlation between a side projected area and an adjustment value for the level of deterioration, and a correlation between the level of deterioration and a deterioration rate, wherein the one or more processors are configured to:

receive sensor data from a weight sensor disposed on a roof rail of the vehicle or a roof carrier of the vehicle;

calculate, based on the received sensor data, a load weight of a load placed on the roof rail or the roof carrier;

receive image data of the load from one or both of an imager disposed in the vehicle and a portable device;

calculate, based on the received image data, a frontal projected area of the load and a side projected area of the load;

determine a first deterioration rate caused by the load weight of the load based on the load weight of the load and the rate of deterioration in specific power consumption per load weight;

determine a second deterioration rate caused by an increase in aerodynamic drag based on the frontal projected area of the load and the side projected area of the load by determining, based on the correlation between the frontal projected area and the level of deterioration in specific power consumption, the level of deterioration corresponding to the frontal projected area, adjusting the level of deterioration based on the side projected area and the correlation between the side projected area and the adjustment value for the level of deterioration, and determining, based on the correlation between the level of deterioration and the deterioration rate, the second deterioration rate corresponding to the adjusted level of deterioration;

determine a total deterioration rate as a total value of the first deterioration rate and the second deterioration rate;

calculate a specific power consumption of the vehicle based on the reference specific power consumption of the vehicle, and the total deterioration rate;

acquire, from a navigator, information on a departure point and a destination;

acquire a current residual amount of charge of an accumulator battery of the vehicle;

acquire map information and information on locations of power charging facilities;

generate route information including a charging timing in travel from the departure point to the destination based on the current residual amount of charge and the calculated specific power consumption by calculating a cruising range based on the current residual amount of charge and the calculated specific power consumption, and retrieving a traveling route from the departure point to the destination via a power charging facility located within the calculated cruising range, based on the calculated cruising range, the map information, the information on the locations of the power charging facilities, and the information on the departure point and the destination; and transmit the route information to the navigator to cause the navigator to display the route information, start route guidance from the departure point to the destination, and perform guidance on power charging based on the route information.

* * * * *